US008612930B2

(12) United States Patent
Quinn et al.

(10) Patent No.: US 8,612,930 B2
(45) Date of Patent: Dec. 17, 2013

(54) METHODS AND APPARATUS FOR DYNAMIC CLASS RELOADING AND VERSIONING

(75) Inventors: Timothy J. Quinn, Lake Forest, IL (US); John R. Rose, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1358 days.

(21) Appl. No.: 12/363,289

(22) Filed: Jan. 30, 2009

(65) Prior Publication Data

US 2010/0199259 A1 Aug. 5, 2010

(51) Int. Cl.
*G06F 9/44* (2006.01)

(52) U.S. Cl.
USPC .......................................................... 717/106

(58) Field of Classification Search
USPC .......................................................... 717/106
See application file for complete search history.

(56) References Cited

U.S. PATENT DOCUMENTS

| | | | |
|---|---|---|---|
| 6,915,511 B2 | 7/2005 | Susarla et al. | |
| 7,073,171 B2 | 7/2006 | Shinn | |
| 7,707,544 B2 * | 4/2010 | Beust | 717/106 |
| 7,761,844 B2 * | 7/2010 | Bove et al. | 717/106 |
| 2008/0120595 A1 * | 5/2008 | O'Farrell et al. | 717/106 |
| 2009/0049423 A1 * | 2/2009 | Yao et al. | 717/108 |

OTHER PUBLICATIONS

"The JavaRebel software is mentioned in the disclosure (section B)," Zeroturnaround, Copyright Webmedia, Ltd, 2007-2009, 12 pages.
Stephan Schmidt, "JavaRebel impressions—Java Reload just like in Rails," Oct. 11, 2007, 3 pages.
Bea, "WebLogic Server Application Classloading," 2009 Bea Systems.

* cited by examiner

*Primary Examiner* — Chun-Kuan Lee
*Assistant Examiner* — Brooke Taylor
(74) *Attorney, Agent, or Firm* — Robert C. Kowert; Meyertons, Hood, Kivlin, Kowert & Goetzel, P.C.

(57) ABSTRACT

Methods and apparatus for dynamic class reloading and versioning that allow developers to change and recompile classes and to have running programs adopt the new versions of the classes dynamically, without redeploying the application. A dynamic class reloading component detects if the environment supports dynamic class redefinition and uses it if supported but does not require it. As the component loads a managed class, it modifies the bytecode of the class and generates additional classes and interfaces to support type-safe class versioning. Unique names are generated for successive versions of a managed class. A separate interface may be generated for each distinct method name and signature implemented on managed classes. Each generated class may implement all the generated interfaces that correspond to its methods. The same class loader that would load each managed class without the component loads the component-generated classes and interfaces.

20 Claims, 12 Drawing Sheets

METHODS AND APPARATUS FOR DYNAMIC CLASS RELOADING AND VERSIONING

BACKGROUND

1. Field of the Invention

This invention relates to computer systems, and more particularly to dynamic class reloading and versioning.

2. Description of Related Art

Java™ may be described as a class-based, platform-independent programming language. A virtual machine may be generally described as a software implementation of a central processing unit (CPU) that runs compiled code (e.g., applets and applications) on a given system or machine, where the code itself remains the same from one system or machine to another. In Java™ technology, the virtual machine that runs compiled Java™ code is referred to as a Java Virtual Machine (JVM™). In the JVM, the basic unit of software is the (Java™) class. A class-based software application (e.g., a Java™ application or applet) running in a virtual machine (e.g., a JVM) might consist of tens, hundreds, or thousands of classes. A class is generally composed of fields that hold data or references to other objects, and methods. The body of each method contains executable instructions (bytecode) that implements a part of the program logic. In order to use a class—to access the data it stores or to execute its methods—the virtual machine (e.g., JVM) first loads the class into memory.

Java™, J2EE™, Java™ EE, and JVM™, as used throughout this document, are trademarks or registered trademarks of Sun Microsystems, Inc. in the United States and other countries.

Class Loaders

Class loaders are one of the cornerstones of virtual machine architectures such as the Java™ Virtual Machine (JVM™) architecture. A class loader is an object that is responsible for loading classes. Programmatically speaking, class loaders are objects that may be defined in code (e.g. Java™ code). In Java™ technology, class loaders are instances of subclasses of abstract class ClassLoader. Given the name of a class, a class loader may attempt to locate or generate data that constitutes a definition for the class. A typical strategy is to transform the name into a file name and then read a "class file" of that name from a file system. The default class loading behavior in the JVM is to load the class file from a specified location (e.g., specified in a class path) into the memory and to execute the bytecode as and when the request comes in for the particular class. Whenever a class refers to another class, for example, by initializing a field or local variable, the referent is immediately loaded (or delegated by that class loader to its parent class loader) by the same class loader that loaded the referencing class. Class loaders may enable a system (e.g., a virtual machine) to load classes without knowing anything about the underlying file system semantics, and may allow applications to dynamically load classes such as Java™ classes as extension modules

Java™ and Java™ Virtual Machine (JVM™) Technology

In Java™ technology, a class loader loads the bytecode from a class's class file into the Java™ Virtual Machine (JVM™, also referred to herein as simply VM), making it available for use in an application. A given class loader can load only one class of a given name. Conventionally, once a class loader has loaded a class, there is no way for application code or the class loader itself to unload the class. Different class loaders may load the same or different bytecode using the same class name. The VM's type system considers such classes to be different; each class is implicitly qualified by the class loader that loads it.

The JVM provides features via which Java™ code, e.g. a programmer's custom Java™ code, can gain control as a class is being loaded and transform the bytecode that will be used in defining the class. For example, classes in the java.instrumentation package in Java™ may be leveraged to provide this feature.

Once a class has been defined, conventional JVM technology allows Java™ code to redefine the class in restricted ways, as described in the Java™ documentation for the java.instrumentation package. Conventionally, the only change allowed is to rewrite the bytecode inside method bodies. The redefinition allowed by conventional JVM technology cannot change the so-called shape of the class by adding or removing fields or methods or changing the signatures of methods or the types of fields.

Java™ technology includes the abstract class java.lang.ClassLoader, also referred to herein as ClassLoader or class loader. Any Java™ code that retrieves bytecode for use in defining classes must extend ClassLoader. Many of its methods can be overridden by subclasses that extend ClassLoader, and in fact some of ClassLoader's methods are defined as abstract, meaning that they must be overridden by subclass implementations. On the other hand, ClassLoader declares some of its methods as final, meaning subclasses cannot override them. The implementations of such final methods in ClassLoader are guaranteed to be the ones that execute. An important method is defineClass. The several variants of this method (all final) contain the logic that actually converts a byte array (or a byte buffer) containing the bytecode of a class into a class definition that can be used throughout the JVM.

Further, the JVM associates a defined class with the specific class loader that invokes defineClass (also referred to herein as the define class method) for that class. This is essentially how the VM implicitly qualifies each class with the loader that loaded the class.

A software developer writing an application, for example an application in a Java™ Platform, Enterprise Edition (which may be referred to as Java™ EE or J2EE™) environment application server, typically follows a cycle of work that involves editing his or her source code, recompiling it, deploying or redeploying the application into the application server, and testing the revisions by running the application, repeating this cycle many times to fix problems in the application or to enhance the application. Often, the application server must do considerable work to redeploy an application, and even when this step takes only a relatively short time, it can still be disruptive to the flow of the developer's work.

Conventionally, VM technology provides limited support for changing a class once it has been loaded. For example, the Java™ HotSpot™ VM supports replacing the bytecode instructions in the bodies of methods, but does not support adding or removing fields or methods, or changing the signature of any method. Such changes are common in normal software development. Conventionally, to make such changes and then use them, a developer must either redeploy the application (if he or she is using a container-based product such as an application server) or restart the VM and rerun the program. Redeploying or rerunning the application is potentially time-consuming and expensive, in part because all classes—even those that have not changed—must be reloaded as part of the redeployment or restart. In addition, redeploying or restarting causes the loss of the current program state. Redeploying or restarting takes significant time and interrupts the flow of the developer's work as he or she performs repetitive cycles of the edit, build, deploy, and run development process.

SUMMARY

Various embodiments of methods and apparatus for dynamic class reloading and versioning are described. Embodiments may allow developers to change and recompile classes and to have running programs adopt the new versions of the classes dynamically, without redeploying or restarting the running application. An implementation of an embodiment of the method may be referred to as a dynamic class reloading component. Embodiments of a dynamic class reloading component may be implemented in development environments or in production environments. Embodiments of a dynamic class reloading component may be implemented, for example, in development environments for developing class-based, platform-independent programming language applications to run in virtual machine (VM) environments, for example for developing Java™ technology applications for Java™ Virtual Machine (JVM™) environments, e.g. Java™ applications on Java™ Platform, Enterprise Edition (Java™ EE) application servers. Embodiments may allow a user to change the types of fields, add or remove fields, modify methods, change the signature of a method, and add or remove methods from a class definition. The modified class may then be dynamically loaded into a running application on the VM by the dynamic class reloading component. To the user, it appears as if the class has been dynamically reloaded, and the application continues to run without requiring redeployment of the application or restarting of the VM. There are no restrictions on the specific type of class loader in use in the VM or application, as long as the proper code source for each class loaded is established.

When, for example, a developer compiles or recompiles a class, the compiler updates the on-disk representation of the class, which may be stored as a .class file, as a class entry in a Java™ ARchive (JAR) file, or elsewhere (the location of a class's bytecode on disk may generally be referred to herein as the "class file"). Embodiments detect when such changes occur, dynamically reload the class as a new version of the class definition, and arrange for existing objects that are instances of older versions of the class to behave as if they were actually instances of the newest version of the class definition. The developer may remove a method or field from a class or change a method's signature; the dynamic class reloading component detects such incompatible changes to the class and arranges for accesses to obsolete methods and fields to throw an exception so that the developer is informed of the incompatibility.

Embodiments of the dynamic class reloading component may use class version naming to support type-safe class versioning. In some embodiments, the dynamic class reloading component, for example using the supported Java API, detects if the VM implementation supports dynamic class redefinition, and uses it if supported but does not require it. The term "managed class" refers to a class that can be reloaded by the dynamic class reloading component and for which several versions may concurrently exist in the JVM. The term "exempt class" refers to a class that is not managed by the dynamic class reloading component. As the dynamic class reloading component loads a managed class, it modifies the bytecode contained in the class and also generates additional classes and interfaces to support type-safe class versioning. New names for successive versions of a managed class are generated that are different from the original class name and from each other, as well as from other classes in the VM environment. A separate interface may be generated for each distinct method name and signature that the developer implements on managed classes. Each generated class may be declared to implement all the generated interfaces that correspond to its methods. The same user- or Java-provided class loader that, without the dynamic class reloading component, would have loaded each managed class loads the generated classes and interfaces.

In embodiments, the dynamic class reloading component may gain control while the VM for an application under development is being started, before the container and application are started to perform initialization tasks including one or more of, but not limited to: defining classes which are to be managed by the component and classes which are to be exempt from management; registering one or more classes of the dynamic class reloading component with the VM; obtaining and storing VM environment information including one or more object references; and modifying one or more methods of the VM environment, including but not limited to class loader and define class methods. The component then returns control to the VM startup.

In some embodiments, the dynamic class reloading component may gain control during the define class method of a class being defined when the define class method is invoked by the class loader for the class. The component may determine if the class being defined is a managed class or an exempt class. If the class is a managed class, the dynamic class reloading component records the revision date/time of the .class file, the .class entry in a JAR file, or other location on disk from which the managed class is loaded (i.e., the class file). The dynamic class reloading component generates an interface for each method on the managed class and for all non-private methods from ancestor classes from which the managed class inherits directly or indirectly. The dynamic class reloading component generates a class named, for example, <managed class name>-0-0, which can be thought of as "class name, version 0.0", and which is the current body class for the managed class. The dynamic class reloading component generates the body class to implement a dynamic class reloading component-defined Body interface as well as the generated interfaces corresponding to the instance methods on the managed class and its ancestor classes, if any. The bytecode for each method defined on the managed class may be used, with some modification, as the bytecode for the same-named method on the body class. Further, the dynamic class reloading component generates getter and setter methods on the body class for each of the protected and package-visible instance fields defined on the managed class. The dynamic class reloading component also generates the corresponding interfaces for these getter and setter methods and declares the body class to implement those interfaces.

The dynamic class reloading component generates a class, for example <managed class name>-0-0-S (class name, version 0.0 for static content), called the current static body class for the managed class. The static body class may be generated to implement the dynamic class reloading component-defined StaticBody interface as well as the generated interfaces corresponding to the static methods on the managed class. A static method is a method associated with a class and used for all instances of the class. A static method acts at the class level, rather than the instance level. An instance method is associated with and used for an instance of a class and acts at the instance level. The bytecode for each static method defined on the managed class may be used, with some modification, as the bytecode for the same-named instance method on the static body class. The dynamic class reloading component generates bytecode for these methods on the static body class to immediately delegate to the corresponding static method on the same-versioned body class. Further, the dynamic class reloading component generates getter and setter methods on the static body class for each of the protected and package-visible static fields defined on the managed class. The dynamic class reloading component also generates the corresponding interfaces for these getter and setter methods and declares <managed class name>-0-0-S to implement those interfaces.

The dynamic class reloading component then transforms the bytecode for the managed class. In some embodiments, the dynamic class reloading component adds a static field of type StaticBody to the bytecode for the managed class, initialized to refer to a singleton instance of the static body class. The dynamic class reloading component adds an instance field of type Body to the bytecode for the managed class. When the transformed constructors of the managed class are invoked, they will populate this field with a reference to a new instance of the current body class. The dynamic class reloading component alters the bytecode for each static method to first make sure that the body and static body classes are up-to-date with respect to the bytecode on-disk in the class file for the managed class, and then to delegate to the same-named instance method on the then-current StaticBody, cast to the interface which the dynamic class reloading component generated for that method. The dynamic class reloading component alters the bytecode for each instance method to first make sure that the body and static body classes are up-to-date, and then to delegate to the same-named instance method on the then-current Body, cast to the interface which the dynamic class reloading component generated for that method. At each location that the bytecode for the managed class invokes a method on a different managed class, the dynamic class reloading component replaces that bytecode with bytecode that checks to see if the currently loaded instance of the managed class is consistent with the disk version of the managed class. The dynamic class reloading component similarly transforms direct references to fields in other managed classes to invocations of the corresponding getter or setter methods generated on that managed class.

One of the transformations which the dynamic class reloading component applies to the original bytecode adds logic just before the invocation of a method on a managed class. This logic makes sure that, before a method on a managed class is invoked, the current body class and static body class are up-to-date with respect to the class file on disk for the corresponding managed class. If the added bytecode detects that the current versions of a managed are out-of-date, it triggers the generation of a new version of the managed class. For illustration, suppose that the current version of class MC is version i, and that the dynamic class reloading component has already generated MC-i-0 and MC-i-0-S. The dynamic class reloading component records the new class file revision date and time for managed class MC. The dynamic class reloading component generates an interface for each method on MC, unless it has already generated a corresponding interface during the initial load of the class or during handling of a previously-detected modification of MC that resulted in a now-out-of-date version. The dynamic class reloading component generates the body class MC-(i+1)-0, similar to MC-0-0 but using the bytecode from the now-modified class file for MC resulting from the developer's most recent change. MC-(i+1)-0 implements Body as well as the relevant generated interfaces corresponding to the instance methods on the latest version of MC. The dynamic class reloading component generates the static body class MC-(i+1)-0-S, similar to MC-0-0-S but using the newly-modified bytecode from the class file for MC. MC-(i+1)-0-S implements StaticBody as well as the relevant generated interfaces corresponding to the static methods on the latest version of MC. The dynamic class reloading component creates a singleton instance of static body class MC-(i+1)-0-S and points MC.staticBody to that new instance. The dynamic class reloading component copies the values of static fields from MC-i-0 to the corresponding static fields on MC-(i+1)-0 for compatible fields. The dynamic class reloading component creates, for each existing instance x of MC, a new instance of body class MC-(i+1)-0 and points x.body to that new instance of MC-(i+1)-0. The dynamic class reloading component copies the values of instance fields from each instance of MC-i-0 to the corresponding new instance of MC-(i+1)-0. Note that all names or labels used herein, including but not limited to MC, Body, .body, StaticBody and .staticBody, are used by way of example and are not intended to be limiting.

Figure 1A:
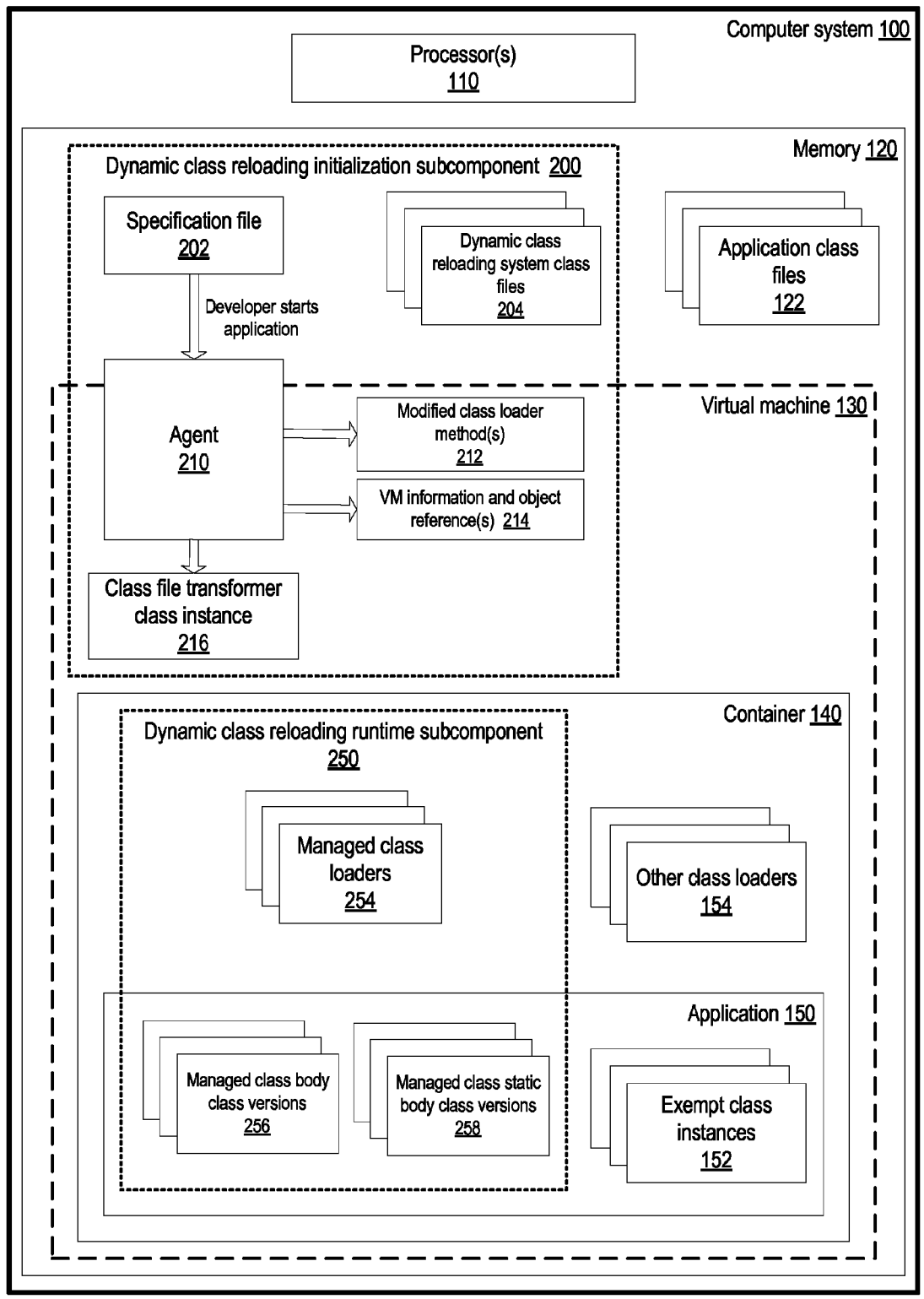
FIGS. 1a and 1b illustrate an example computer system implementing a dynamic class reloading component, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for dynamic class reloading and versioning are described. Embodiments may allow developers to change and recompile classes and to have running programs adopt the new versions of the classes dynamically, without redeploying or restarting the running application. Embodiments of the methods for dynamic class reloading and versioning described herein may be implemented, for example, as one or more components, modules, plug-ins, agents, code segments or other software entities in development environments for developing class-based, platform-independent programming language programs or applications to run in virtual machine (VM) environments, for example for developing Java™ technology applications for Java™ Virtual Machine (JVM™) environments, e.g. Java™ applications on Java™ Platform, Enterprise Edition (Java™ EE) application servers. For simplicity, an implementation of an embodiment of the method for dynamic class reloading and versioning may be referred to herein as a dynamic class reloading component.

While embodiments of the methods for dynamic class reloading and versioning are generally described herein as applied in a Java™ EE application server, embodiments may be used in any Java™ Virtual Machine to dynamically reload class versions. Furthermore, while embodiments are generally described herein in relation to developing applications in application server environments on virtual machines, embodiments may be applied to developing applications in other container environments than application server environments and in other environments than VM environments. Furthermore, while embodiments are generally described herein in relation to development environments, embodiments may be implemented in production environments as well as in development environments. Moreover, while embodiments of the method for dynamic class reloading and versioning are generally described in relation to Java™, JVM, and Java™ EE, it is to be understood that embodiments may be applied to or in other class-based, platform-independent programming languages than Java™, other virtual machine environments than JVM, and other programming platforms for developing and running distributed multi-tier architecture (Enterprise) applications than Java™ EE.

Embodiments of the dynamic class reloading component may provide more flexibility in the types of changes that the developer can make to classes when compared to conventional Java™ and JVM technology or other conventional technologies. Using embodiments, developers may modify more aspects of a class than conventional class reloading technology allows. Embodiments of the dynamic class reloading component may allow a developer to change the types of fields, add or remove fields, modify methods, change the signature of a method, and add or remove methods from a class definition. The modified class may then be dynamically loaded into a running application under development on the VM by the dynamic class reloading component. To the developer, it appears as if the class has been dynamically reloaded, and the application continues to run without requiring redeployment of the application or restarting of the VM. Note that the combination of the name of the method and the types of arguments passed to the method is referred to as the signature of the method. In addition, embodiments do not limit the active class loader's type; there are no restrictions on the specific type of class loader in use in the VM or application, as long as the proper code source for each class loaded is established.

Although some application development situations may require the redeployment of the application in order for the application to behave correctly, such as if the developer changes Java™ EE annotations in the source code of the application, other types of changes a developer might make to the application would not require redeployment if the container (e.g., application server) could detect that the class had changed and then reload the new definition of the class and begin using it. Embodiments of the dynamic class reloading component described herein provide such detection and reloading, thus allowing the developer to skip the redeployment step in many cases. When the developer compiles or recompiles a Java™ class, the Java™ compiler updates the on-disk representation of the class in the class file or the class entry in a Java™ ARchive (JAR) file. Note that the bytecode for the class may reside elsewhere than in a class file or in a JAR file, for example in a relational database. The underlying class loader is ultimately responsible for retrieving the bytecode from wherever it is stored. Thus, embodiments do not limit how the bytecode is stored or how the class loaders retrieve the bytecode. This document refers to the class file with the understanding that the actual bytecode could reside in a class file, as a class entry in a JAR file, or elsewhere. Embodiments of the dynamic class reloading component detect when such changes occur, dynamically reload the class as a new "version" of the class definition, and arrange for existing objects that are instantiations of the older versions of the class to behave as if they were actually instances of the newest version of the class definition. Because the developer might remove a method from a class or change a method's signature, an embodiment of the dynamic class reloading component detects such incompatible changes and arranges for the old, now-obsolete methods to throw an exception so that the developer is informed of the incompatibility.

In some embodiments, only classes from the developer's application are subject to reloading and versioning by the dynamic class reloading component, while some classes, for example classes used in an application under development that are from Java™ itself or from the container (e.g., application server) are handled normally. The term "managed class" refers to a class that can be reloaded by the dynamic class reloading component and for which several versions may concurrently exist in the JVM. In one or more embodiments, the dynamic class reloading component may be configured to automatically exempt certain classes from being managed (such as its own classes as well as those in packages that, for example, start with java, javax, sun, etc.). In one or more embodiments, the dynamic class reloading component may allow the user to extend this list to include other package prefixes representing exempt classes, that is classes that are not to be managed according to the dynamic class reloading methods described herein. In one or more embodiments, the dynamic class reloading component may allow the user to specify particular classes that are to be managed and/or to specify particular classes that are not to be managed.

Because of additional code logic that embodiments of the dynamic class reloading component may insert at several points, performance of an application and/or a container (e.g., an application server) may be slower than without the dynamic class reloading component. In addition, because of the potential for heap growth in some embodiments, even with the use of weak references in some embodiments, the user may need to redeploy an application periodically or restart the container occasionally in order to manage the heap.

Dynamic Class Reloading Component Embodiments

Some embodiments of the dynamic class reloading component may use class version naming to support type-safe class versioning. In some embodiments, the dynamic class reloading component, for example using the supported Java API, detects if the VM implementation supports dynamic class redefinition, and uses it if supported but does not require it. As the dynamic class reloading component loads a managed class, it modifies the bytecode contained in the class and also generates additional classes and interfaces to support type-safe class versioning. New names for successive versions of a managed class are generated that are different from the original class name and from each other. In one or more embodiments, the names of the generated classes are generated so that the named classes do not conflict with any other class names in the VM environment including class names that the developer has used or that have been generated for any of the developer's other classes, class names in the Java™ libraries, and so on. A separate interface may be generated for each distinct method name and signature that the developer implements on managed classes. Each generated class may be declared to implement all the generated interfaces that correspond to its methods. The same user- or Java-provided class loader that, without the dynamic class reloading component, would have loaded each managed class loads the generated classes and interfaces.

Figure 1B:
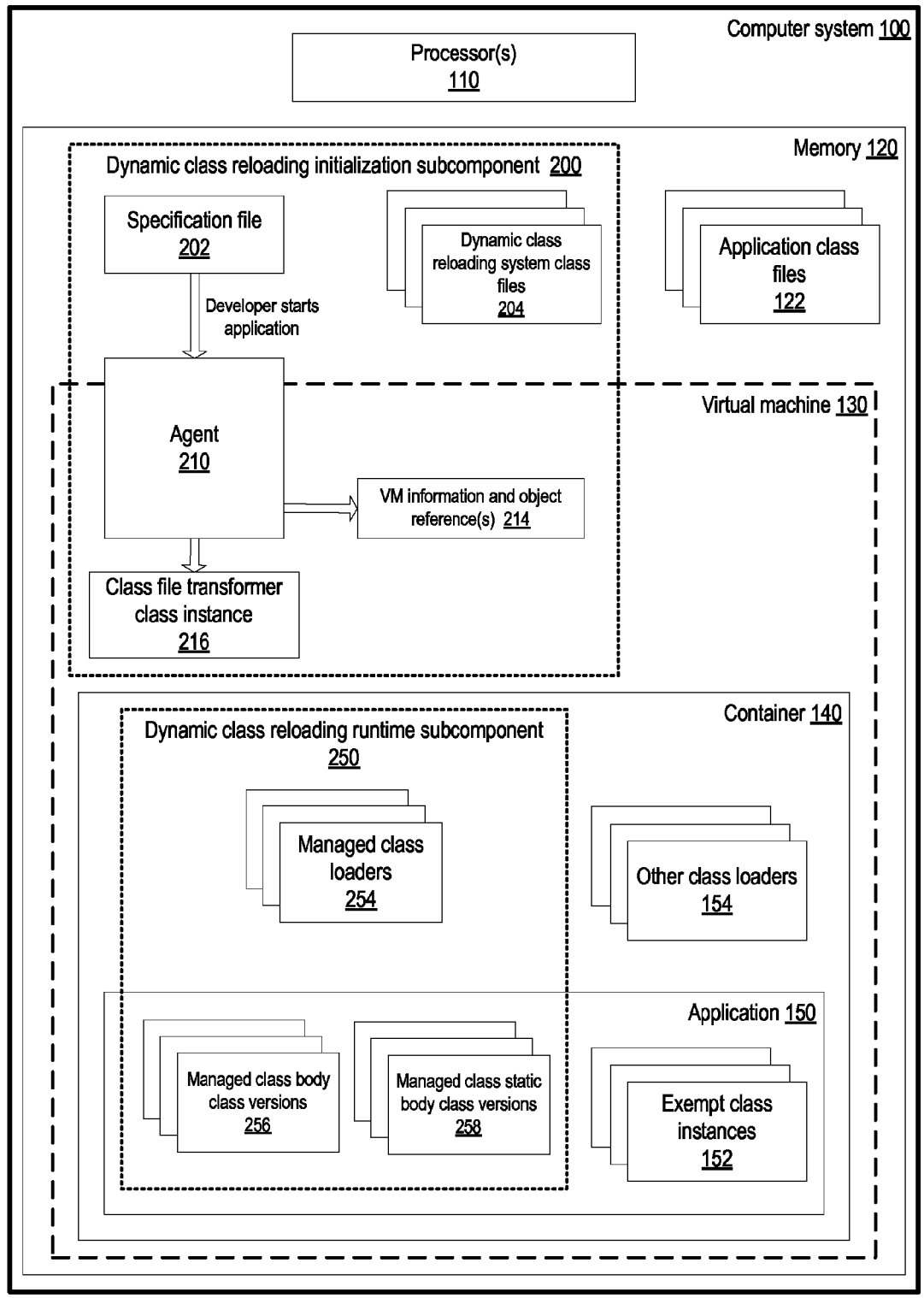

FIGS. 1a and 1b illustrate an example computer system implementing a dynamic class reloading component using class version naming, according to some embodiments. Computer system 100 may be any of various types of devices, including, but not limited to, a personal computer system, desktop computer, laptop or notebook computer, mainframe computer system, workstation, network computer, or other suitable device. In general, system 100 may be any device with a digital heartbeat capable of performing as a development platform as described herein. System 100 may include at least one processor 110. The processor 110 may be coupled to a memory 120. Memory 120 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 100 may couple over a network to one or more other devices via one or more wired or wireless network interfaces.

System 100 may include, in memory 120, application class files 122 for an application 150 under development, dynamic class reloading component class files 204, and a specification file 202 (in Java™ technology, a JAR file) for the dynamic class reloading component. System 100 may also include, in memory 120, an implementation of a class-based, platform-independent programming language environment (not shown). Java™ technology is an example of such a programming language environment. An integration and development environment (IDE) for developing programs or applications in accordance with the programming language may also be included in memory. Dynamic class reloading component class files 204 and specification file 202 may be used in, and thus may be considered part of, dynamic class reloading initialization subcomponent 200, which operates during startup of an application 150 under development, as described below in relation to FIG. 2.

System 100 may include, in memory 120, a virtual machine 130 (e.g., a JVM) and a container 140 (e.g., an application server such as a Java™ EE technology application server), which may be started in response to a developer starting an application 150 under development. During startup of the application 150, container 140, and virtual machine 130 the dynamic class reloading initialization subcomponent 200 may perform several tasks. The virtual machine 130 starts up, detects the agent 210, and calls into the agent 210 during startup. Agent 210 then creates an instance of a class called a class file transformer 216, and registers the class file transformer class instance 216 with the virtual machine 130.

Runtime operations of the dynamic class reloading component may be made more efficient in some ways by redefining the behavior of the virtual machine 130 implementation's class loader during startup. However, the virtual machine 130 implementation's class loader may have already been loaded by the time the agent 210 is called during startup. In some implementations of virtual machines 130, it is possible, once a class has been loaded into the virtual machine 130, to change the bytecode for a method in the class. This capability may be referred to as dynamic class redefinition. However, virtual machine implementations are not required to support dynamic class redefinition, and thus some VM implementations may support this capability while other VM implementations may not. Thus, in some embodiments, the agent 210 may call into the virtual machine 130 to determine if the virtual machine implementation supports dynamic class redefinition. If the virtual machine 130 does support class redefinition, then the agent 210 may modify or redefine one or more methods of the class loader implementation of the virtual machine 130 to generate modified class loader methods 212 as illustrated in FIG. 1a. If the virtual machine 130 does not support class redefinition, then the agent 210 does not modify the class loader implementation. This is illustrated in FIG. 1b, in which there is no modified class loader method(s) 212.

In this embodiment, some internal operations of the dynamic class reloading runtime subcomponent 250 may be slightly different depending on whether the class loader method(s) were modified during startup (i.e., the virtual machine 130 implementation supports dynamic class definition) or not (i.e., the virtual machine 130 implementation does not support dynamic class definition). However, from the user's perspective, there may be little or no difference in behavior. Internally, some technical details related to how the classes generated by the class file transformer class instance 216 (a managed class body class version 256 and a static body class version 258 for each instance of loading a new or modified managed class) are loaded into the virtual machine 130 may be different. In the case of virtual machine implementations that support dynamic class redefinition, the dynamic class reloading runtime subcomponent 250 can leverage the standard virtual machine 130 class loading method that requests the dynamic class reloading runtime subcomponent 250 to provide the generated classes only when the VM class loader discovers a need for them. In the case of virtual machine implementations that do not support dynamic class redefinition, when the dynamic class reloading runtime subcomponent 250 transforms the user's managed class and generates a managed class body class version 256 and a static body class version 258, the dynamic class reloading runtime subcomponent 250, instead of relying on the standard virtual machine 130 class loading method, explicitly instructs the VM class loader to load the classes that were generated by the dynamic class reloading runtime subcomponent 250.

While the above describes an embodiment of the dynamic class reloading component in which the agent 210 calls into the virtual machine 130 to determine if the virtual machine implementation supports dynamic class redefinition, modifies one or more methods of the virtual machine's class loader if the VM supports dynamic class redefinition, and handles the loading of generated classes differently depending on whether the virtual machine implementation supports dynamic class redefinition, some embodiments of the dynamic class reloading component may be implemented that do not determine if the virtual machine implementation supports dynamic class redefinition at startup. In one such embodiment, the dynamic class reloading component may instead assume that the virtual machine implementation supports dynamic class redefinition, perform modification of the VM class loader method(s) during startup, and handles class loading accordingly as described above. This embodiment is applicable only to VM implementations that support dynamic class reloading. In another such embodiment, the dynamic class reloading component does not attempt to modify the VM class loader methods during startup, and handles class loading according to the above description for the case where the VM implementation does not support dynamic class redefinition. This embodiment is applicable both to VM implementations that support dynamic class reloading and to VM implementations that do not support dynamic class reloading.

Once the application 150, container 140, and virtual machine 130 are started, during the process of which the dynamic class reloading initialization subcomponent 200 may perform several tasks as described above and as described more fully below in relation to FIG. 2, memory 120 may be viewed as including an instance of dynamic class reloading runtime subcomponent 250, as described below in relation to FIGS. 3 through 5. Runtime subcomponent 250 may be viewed as extending across a portion of the container 140 and the application 150.

Runtime subcomponent 250 may include, but is not limited to, managed class loaders 254, managed class body class versions 256, and managed class static class versions 258. Body class versions 256 and static class versions 258 are instances of classes that are created and managed by the dynamic class reloading component (i.e., that are managed classes). Each body class 256 version has a single corresponding static body class version 258; each loaded managed class may be instanced as one or more versions, with each version of the managed class including a body class 256 instance and a static body class 258 instance.

Container 140 and application 150 may also include other class loaders 154 and exempt class instances 152. Note that an instance 152 of an exempt class may be loaded by either one of the other class loaders 154 or by one of managed class loaders 254. A managed class loader 254 is a class loader that is responsible for loading at least one managed class. However, a managed class loader 254 may load one or more other classes that are not managed (i.e., that are exempt classes). Other class loaders 154 thus include any class loader in the system that is not responsible for loading any managed class according to the dynamic class reloading component. In some embodiments, however, during operation of other class loaders 154 in the VM 130, runtime logic of the dynamic class reloading component (e.g., logic inserted into the VM's class loaders during initialization of the dynamic class reloading component, if the VM implementation supports class redefinition) may be executed, for example to check if a class being loaded is a managed class or an exempt class.

It is contemplated that some embodiments may be implemented using a single instance of computer system 100, while in other embodiments multiple such systems, or multiple nodes making up computer system 100, may be configured to host different portions or instances of embodiments. For example, in some embodiments some elements may be implemented via one or more nodes of computer system 100 that are distinct from those nodes implementing other elements.

Figure 2:
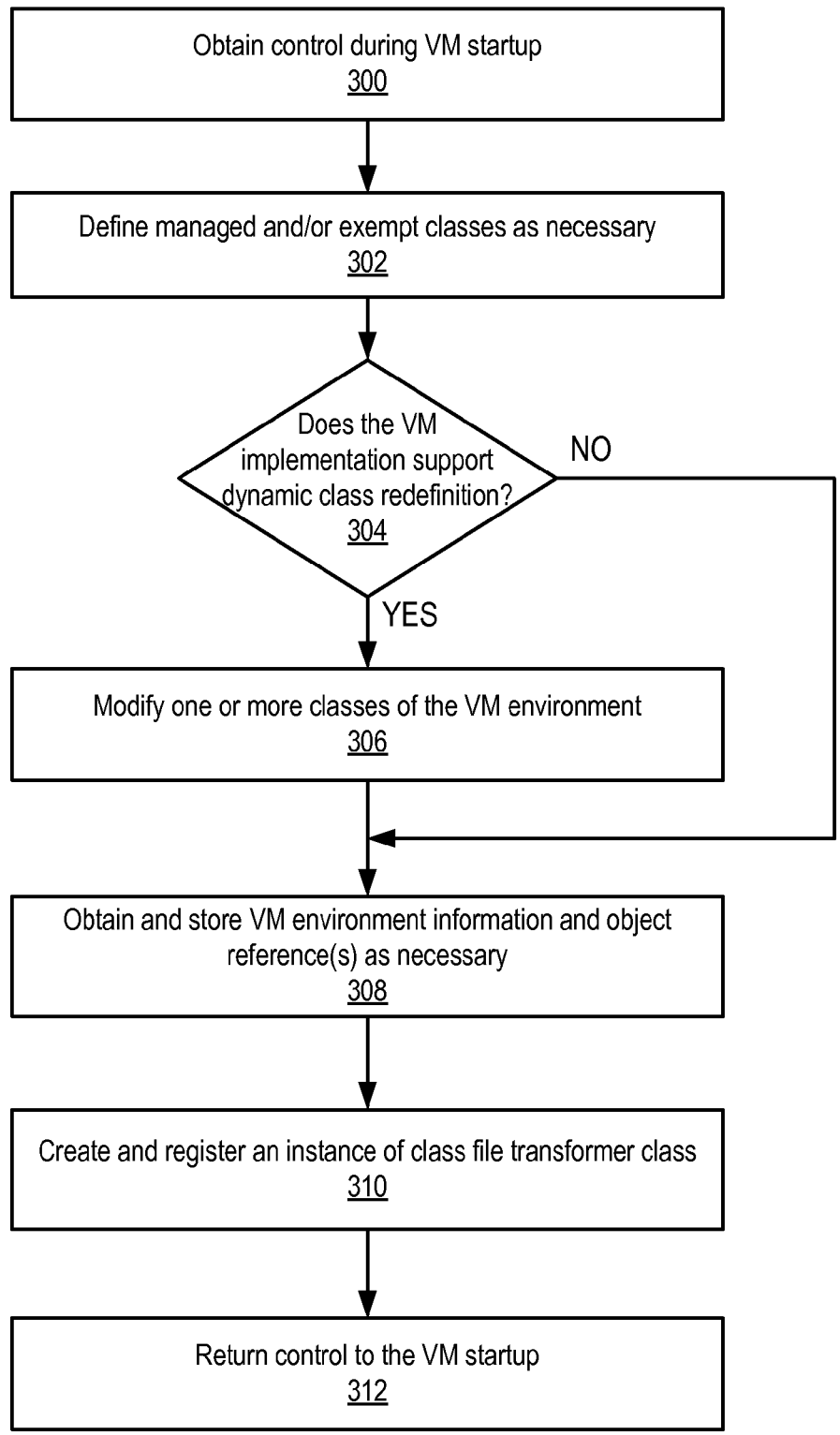
FIG. 2 illustrates a method for initializing the dynamic class reloading component for an application under development according to one or more embodiments.
Figure 3:
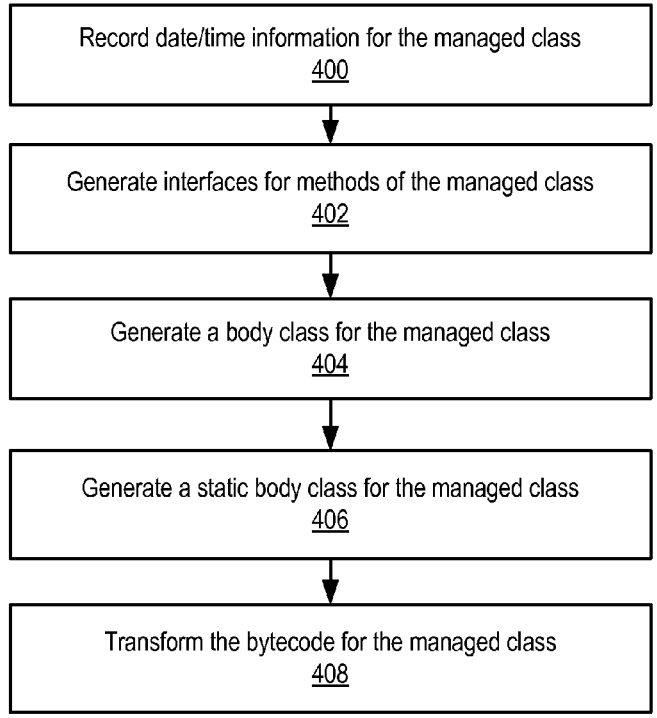
FIG. 3 illustrates operations of the dynamic class reloading component during initial loading of a managed class, according to one or more embodiments.
Figure 4:
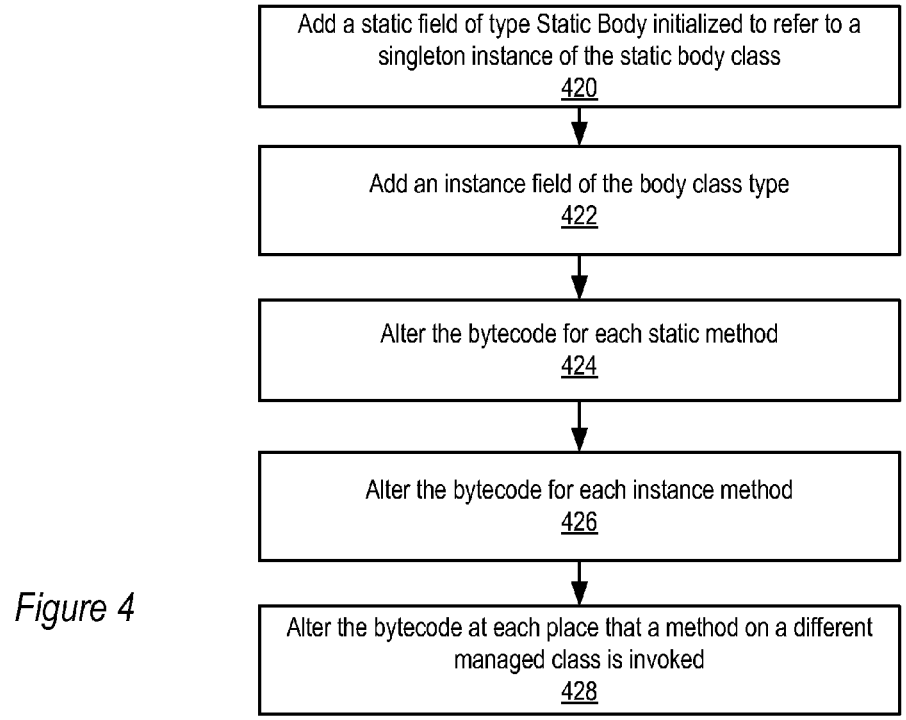
FIG. 4 illustrates operations of the dynamic class reloading component during initial loading of a managed class when transforming the bytecode for the managed class, according to one or more embodiments.
Figure 5:
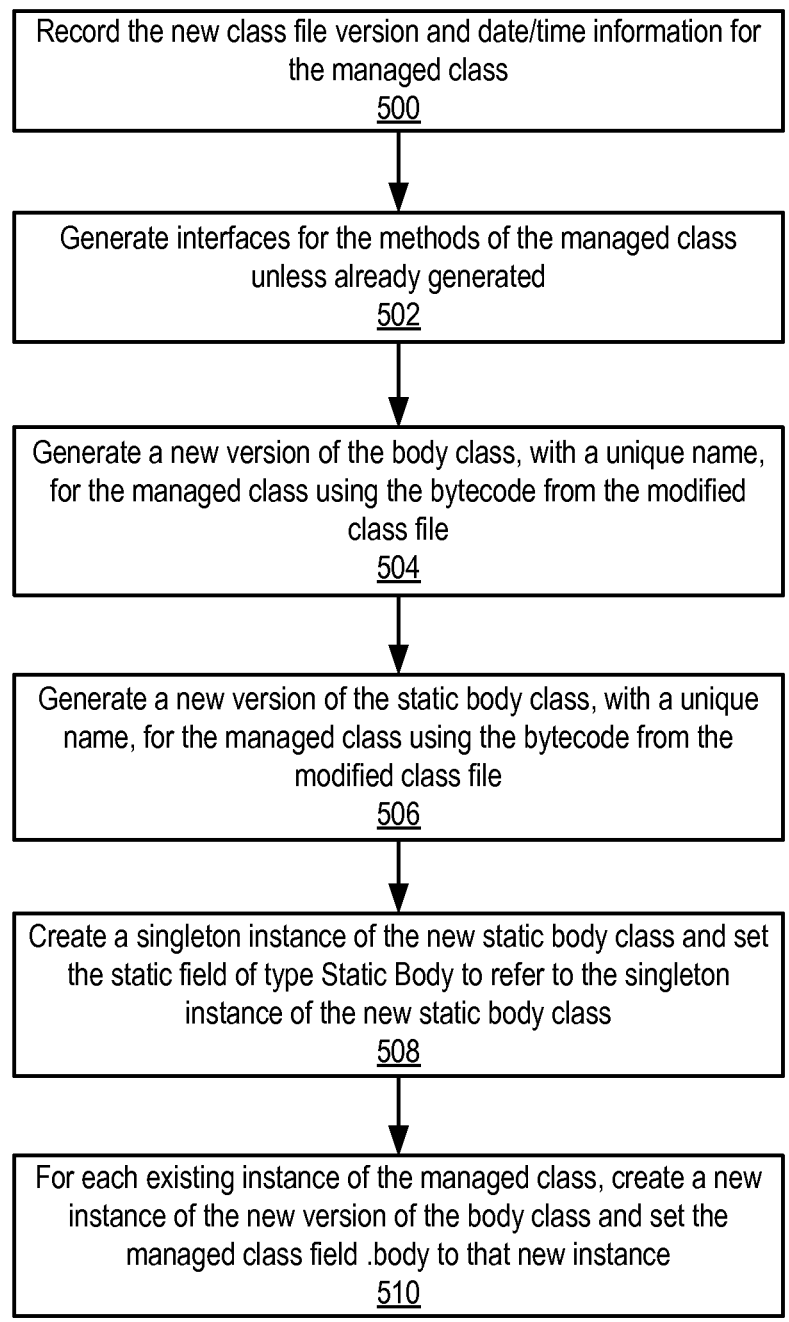
FIG. 5 illustrates operations of the dynamic class reloading component when handling a detected new version of a managed class, according to one or more embodiments.

FIGS. 2 through 5 and the discussions thereof describe aspects and operations of some embodiments of the class reloading and versioning method and apparatus, with reference to FIGS. 1a and 1b. In general, the dynamic class reloading component can be viewed as including an initialization subcomponent 200 and a runtime subcomponent 250, as illustrated in both FIGS. 1a and 1b. The initialization subcomponent 200 performs tasks during initialization of the VM 130, before the container 140 and application 150 under development are started. FIG. 2 is specifically directed at operations of the initialization subcomponent 200. The runtime subcomponent 250 performs tasks during execution of the application 150 under development in the container 140 to perform the runtime dynamic class reloading and versioning for managed classes of the application 150. FIGS. 3 through 5 are directed at operations of the runtime subcomponent 250.

While embodiments are illustrated and described that include an initialization component that performs several tasks during startup of the VM made necessary because the VM environment may not directly support the dynamic class reloading component, embodiments are possible in which at least some of these initialization tasks may not be necessary. For example, a VM development environment may be preconfigured to support some features described herein as being implemented during the initialization phase by the initialization component, thus making it unnecessary to perform at least a portion of the initialization tasks. For example, it is possible that a VM development environment may be preconfigured to support implementations of the class loader that are configured to perform similarly to the modified class loader described herein in relation to some embodiments, which are so modified at startup during the initialization phase of the dynamic class reloading component.

Initialization Subcomponent

FIG. 2 illustrates a method for initializing the dynamic class reloading component for an application under development according to one or more embodiments. The method of FIG. 2 may be implemented by an initialization subcomponent of the dynamic class reloading component, for example initialization subcomponent 200 of FIG. 1, and discussion of the method may refer to various elements of FIG. 1.

As indicated at 300, the dynamic class reloading initialization subcomponent may obtain control during startup of the VM, before the container 140 (e.g., an application server) and application 150 are started. In some embodiments, the classes 204, methods, and possibly other data and information used by the dynamic class reloading component may be specified in a specification file 202, for example, in Java™ technology, in a Java™ Archive (JAR) file. In some embodiments, to invoke the dynamic class reloading component for an application 150 under development, the developer specifies the dynamic class reloading component specification file 202 (e.g., a JAR file) on the command line when starting the VM 130 for the application 150. In some embodiments, the developer may also specify one or more options or variables for the dynamic class reloading component on the command line.

Class reloading and versioning may be most effective when it is transparent, requiring changes in neither the application class files 122 the developer writes nor the container 140 logic itself. In some embodiments, the dynamic class reloading component may be initialized by an agent 210, e.g. a Java™ agent. In Java™ technology, a Java™ agent 210 typically gains control because the Java™ command line specifies the -javaagent option, specifying the JAR file 202 that contains the agent. The VM 130, not the developer's application 150 or the container 140, loads and starts the Java™ agent 210. This allows the dynamic class reloading component to function without the application 150 or the container 140 being aware of its presence and without requiring changes to either the application 150 or the container 140 to provide support for the dynamic class reloading component.

In some embodiments, loading instructions for the agent 210 may be defined in dynamic class reloading component specification file 202, with class definitions for the agent 210 in one or more dynamic class reloading component class files 204. In some embodiments in a Java™ environment, a Java™ command line option on the command line used to start an application under development in a VM environment may be used to invoke the dynamic class reloading component for the application under development. In some embodiments, the command line option may be the -javaagent command line option specifying the dynamic class reloading component JAR file 202. The following is an example of such a command line option:

-javaagent:<path to dynamic class reloading component JAR file>

This Java™ command line option instructs the VM 130, during initialization before starting the container 140 and application 150, to run a Java™ agent 210, and specifies where to find the classes for the agent 210 (i.e., the path to the JAR file 202).

As indicated at 302, the dynamic class reloading initialization subcomponent may define managed and/or exempt classes for the application under development as necessary. In some embodiments, as part of the -javaagent option, a string may be appended for use by the Java™ agent 210. The following is an example of the -javaagent command line option with optional string:

-javaagent:<JAR path>[=<options>]

In some embodiments, the dynamic class reloading component may be configured to automatically exempt certain classes from being managed (such as its own classes as well as those in packages that, for example, start with java, javax, sun, etc.). In some embodiments, the optional string may be used to extend this list to include other package prefixes representing additional exempt classes 152, that is classes that are not to be managed according to the dynamic class reloading methods described herein, and/or to specify classes, even in the class packages exempted by default, that are to be managed. Thus, in some embodiments, the dynamic class reloading component may allow the user to specify particular classes which are to be managed in an otherwise exempted class package and/or to specify particular classes which are not to be managed in an otherwise managed class package. The following is an example of the -javaagent command line option with optional string including examples of exclude and include commands to be interpreted by the Java™ agent 210:

-javaagent:<JAR path>[=exclude=<class specifications> include=<class specifications>]

In some embodiments, [=<options>] may be used by the developer to specify other options or parameters to the dynamic class reloading component agent 210.

In some implementations of virtual machines 130, it is possible, once a class has been loaded into the virtual machine 130, to change the bytecode for a method in the class. This capability may be referred to as dynamic class redefinition. However, virtual machine implementations are not required to support dynamic class redefinition, and thus some VM implementations may support this capability while other VM implementations may not. Thus, in some embodiments, at 304, the dynamic class reloading initialization subcomponent may determine if the VM implementation supports dynamic class reloading. At 304, if the VM implementation supports dynamic class reloading, then, as indicated at 306, the dynamic class reloading initialization subcomponent may modify one or more methods of the VM environment. In some embodiments, the invoked Java™ agent 210 may redefine the Java™ class loader (java.lang.ClassLoader) object to generate one or more modified class loader method(s) 212, as described below in the section titled Redefining the class loader. At 304, if the VM implementation does not support dynamic class reloading, then element 306 is not performed.

As indicated at 308, the dynamic class reloading initialization component may obtain and store VM environment information and object reference(s). Some embodiments of the dynamic class reloading component may employ an agent 210, e.g. a Java™ agent, to perform one or more initialization tasks. In some embodiments, one of these initialization tasks is to obtain VM environment information and object reference(s) 214. In some implementations of Java™ technology that support dynamic class reloading, the ability to redefine a previously loaded class may be provided in part by a java.instrumentation.Instrumentation object that the JVM 130 creates. A method by which Java™ code can obtain an instance of such an object is by providing a Java™ agent 210 which gains control early in the life cycle of the VM 130, after the VM 130 has started but before the VM 130 has started the container 140 logic or the developer's application 150. Thus, in some embodiments, a Java™ agent 130 of the dynamic class reloading component, invoked by a command line option, may store a reference to the JVM-provided Instrumentation object so that runtime subcomponent 250 of the dynamic class reloading component can use it. In some embodiments, the Java™ agent 210 may obtain and store other object references and/or other information about the VM 130 environment for use by the dynamic class reloading component.

A Java™ agent 210 may thus be used by some embodiments of the dynamic class reloading component during initialization to achieve transparency; to obtain information, for some Java™ virtual machine implementations including an object reference to the Instrumentation object from the JVM 130, and, for some Java™ virtual machine implementations, to redefine the Java™ class loader. In some embodiments, a Java™ agent may be used to perform one or more other tasks.

As indicated at 310, the dynamic class reloading initialization subcomponent may create an instance of a class file transformer class and register the class file transformer class instance with the virtual machine.

As indicated at 312, once finished with the initialization tasks for the dynamic class reloading component, the dynamic class reloading initialization subcomponent may return control to the VM startup.

FIG. 2 is not intended to be limiting. The elements illustrated in FIG. 2 may be performed in other orders than in the illustrated order, and other embodiments of the method illustrated in FIG. 2 may include additional elements not shown in FIG. 2, different elements than those shown in FIG. 2, or may include fewer elements than those shown in FIG. 2.

For example, some embodiments of the dynamic class reloading component may be implemented that do not determine if the virtual machine implementation supports dynamic class redefinition at startup. In other words, these embodiments may not include element 304 of FIG. 2. In one such embodiment, the dynamic class reloading component may assume that the virtual machine implementation supports dynamic class redefinition and thus may always perform modification of the VM class loader method(s) during startup as indicated at 306. In another such embodiment, the dynamic class reloading component may assume that the virtual machine implementation does not support dynamic class redefinition and thus not attempt to modify the VM class loader methods during startup. This embodiment is applicable both to VM implementations that support dynamic class reloading and to VM implementations that do not support dynamic class reloading.

Redefining the Class Loader

One of the java.lang.ClassLoader.defineClass methods runs for any class being defined in the JVM 130. Of the several variants of defineClass, some delegate to others. Two variants of defineClass invoke native code, which actually defines a class. Some embodiments of a dynamic class reloading initialization subcomponent of the dynamic class reloading component may, for VM implementations that support dynamic class redefinition, modify or augment the default class loader method(s) by adding bytecode instructions to at least these two defineClass methods so that, during runtime, the modified class loader method(s) 212 invoke a method of the dynamic class reloading component which first detects whether a class being defined is a managed class or an exempt class, for example according to the list of exempt package prefixes provided by the dynamic class reloading component and optionally modified by the user. If the class is exempt, then the bytecode instructions added by the dynamic class reloading component returns immediately and the unmodified remainder of the ClassLoader.defineClass method runs, thus defining the class normally. If, however, the bytecode instructions added by the dynamic class reloading component concludes that the class is a managed class, then the bytecode instructions may perform additional processing as described below, after which the unmodified remainder of the ClassLoader.defineClass method runs to load the class instances created by the dynamic class reloading component.

Runtime Subcomponent

JVM technology generally permits only one class of a given name to be loaded by a single class loader. In typical Java™ applications and in application servers, a single class loader loads many classes because versioning is not required. As the dynamic class reloading component loads a managed class, it modifies the bytecode contained in the class and also generates additional classes and interfaces to support type-safe class versioning. New names for successive versions of a managed class are generated that are different from the original class name and from each other, and from all other classes in the VM environment. A separate interface may be generated for each distinct method name and signature that the developer implements on managed classes. Each generated class may be declared to implement all the generated interfaces that correspond to its methods. The same user- or Java-provided class loader that, without the dynamic class reloading component, would have loaded each managed class loads the generated classes and interfaces. During runtime of a user's application in a VM, the dynamic class reloading component performs operations when a user's class is first loaded (see the section titled Initial managed class loading) and when the user changes the source code for one or more managed classes and recompiles them, thus updating the on-disk class files containing the bytecode for those classes (see the section titled Response to a New Version of a Managed Class).

Initial Managed Class Loading

To modify the bytecode of the user's class during its initial loading, some embodiments of the dynamic class reloading component may insert a class file transformer at startup of the virtual machine, for example using the Java Instrumentation API, as described above. The virtual machine calls or runs this class file transformer automatically whenever it attempts to load a class. For managed classes, the class file transformer reads the bytecode for the managed class and generates several classes and interfaces; the generated classes and interfaces are then loaded using the same class loader that the virtual machine is using to load the managed class. At the time of this initial load of the managed class, some embodiments of the dynamic class reloading component, specifically the class file transformer of the dynamic class reloading component, may perform a method similar to or as illustrated in FIG. 3. For the sake of illustration, an example of a managed class called MC is referred to.

FIG. 3 illustrates operations of the dynamic class reloading component during initial loading of a managed class, according to one or more embodiments. In some embodiments, the dynamic class reloading component may gain control during the define class method of a class being defined when the define class method is invoked by the class loader for the class. The component may determine if the class being defined is a managed class or an exempt class. If the class is a managed class, then the operations illustrated in FIG. 3 may be performed. As indicated at 400, the dynamic class reloading component records the revision date/time of the class file (e.g., the .class file, the .class entry in a JAR file, or other location on disk from which the managed class MC is loaded). The recorded date/time may be used, for example, to check the managed class MC when a method on the class is invoked to determine if the current instance is up-do-date with the class file on disk.

As indicated at 402, the dynamic class reloading component generates an interface for each method on MC and for all non-private methods from ancestor classes from which MC inherits directly or indirectly.

As indicated at 404, the dynamic class reloading component generates a class named, for example, MC-0-0, which can be thought of as "class MC, version 0.0", and which is the current body class for MC. Note that the name format <class name>-0-0 is given by way of example; other formats for the naming of managed class versions than those given may be used. The dynamic class reloading component generates MC-0-0 to implement a dynamic class reloading component-defined Body interface as well as the generated interfaces corresponding to the instance methods on MC and its ancestor classes. The bytecode for each method defined on MC may be used, with some modification, as the bytecode for the same-named method on MC-0-0. Further, the dynamic class reloading component generates getter and setter methods on MC-0-0 for each of the protected and package-visible instance fields defined on MC. The dynamic class reloading component also generates the corresponding interfaces for these getter and setter methods and declares MC-0-0 to implement those interfaces.

As indicated at 406, the dynamic class reloading component generates a class MC-0-0-S (class MC, version 0.0 for static content), called the current static body class for MC. MC-0-0-S may be generated to implement the dynamic class reloading component-defined StaticBody interface as well as the generated interfaces corresponding to the static methods on MC. A static method is a method associated with a class and used for all instances of the class; an instance method is associated with and used for an instance of a class. The bytecode for each static method defined on MC may be used, with some modification, as the bytecode for the same-named instance method on MC-0-0-S. The dynamic class reloading component generates bytecode for these methods on MC-0-0-S to immediately delegate to the corresponding static method on MC-0-0. Further, the dynamic class reloading component generates getter and setter methods on MC-0-0-S for each of the protected and package-visible static fields defined on MC. The dynamic class reloading component also generates the corresponding interfaces for these getter and setter methods and declares MC-0-0-S to implement those interfaces.

As indicated at 408, the dynamic class reloading component then transforms the bytecode for MC. A method for transforming the bytecode that may be used is illustrated in FIG. 4.

FIG. 4 illustrates operations of the dynamic class reloading component during initial loading of a managed class when transforming the bytecode for the managed class, according to one or more embodiments. As indicated at 420, the dynamic class reloading component adds a static field of type StaticBody to the bytecode for MC, initialized to refer to a singleton instance of MC-0-0-S.

As indicated at 422, the dynamic class reloading component adds an instance field of type Body to the bytecode for MC. When the transformed constructors of MC are invoked, they will populate this field with a reference to a new instance of the current body class.

As indicated at 424, the dynamic class reloading component alters the bytecode for each static method to first make sure that the body and static body classes are up-to-date with respect to the bytecode on-disk in the class file for MC, and then to delegate to the same-named instance method on the then-current StaticBody, cast to the interface which the dynamic class reloading component generated for that method at 422.

As indicated at 426, the dynamic class reloading component alters the bytecode for each instance method to first make sure that the body and static body classes are up-to-date, and then to delegate to the same-named instance method on the then-current Body, cast to the interface which the dynamic class reloading component generated for that method at 422.

As indicated at 428, at each location that the bytecode for MC invokes a method on a different managed class (e.g., a managed class MD), the dynamic class reloading component replaces that bytecode with bytecode roughly equivalent to the example logic below. For example, suppose the method is named "m" and that the dynamic class reloading component generated the interface MD_m which defined that method. The dynamic class reloading component may transform the original developer's code:

```
MD myMD = new MD( );
myMD.m( );
``` into the following:

```
MD myMD = new MD( );
MD.ensureCurrent( );
((MD_m) myMD.body)m( );
```

The call to ensureCurrent( ) checks to see if the currently loaded instance of MD is consistent with the disk version of MD. In other words, the call to ensureCurrent( ) checks to see if MD is up-to-date.

The dynamic class reloading component similarly transforms direct references to fields in other managed classes to invocations of the corresponding getter or setter methods generated on that managed class.

Response to a New Version of a Managed Class

As illustrated in the example above, one of the transformations which the dynamic class reloading component applies to the original bytecode adds logic just before the invocation of a method on a managed class. This logic makes sure that, before a method on a managed class is invoked, the current body class and static body class are up-to-date with respect to the class file on disk for the corresponding developer's managed class, e.g. example class MC. If the developer has modified and recompiled the code for that class, the added bytecode detects that the current versions of those generated classes are now out-of-date and triggers the generation of a new version of the managed class. A method for handling the detection of a new version of a managed class that may be used in some embodiments is illustrated in FIG. 5.

FIG. 5 illustrates operations of the dynamic class reloading component when handling a detected new version of a managed class, according to one or more embodiments. Again, the example managed class MC is used for illustrative purposes. For illustration, suppose that the current version of class MC is version i, and that the dynamic class reloading component has already generated MC-i-0 and MC-i-0-S. As indicated at 500, the dynamic class reloading component records the new class file revision date and time for managed class MC.

As indicated at 502, similar to during the initial load, the dynamic class reloading component generates an interface for each method on MC, unless it has already generated a corresponding interface during the initial load of the class or during handling of a previously-detected modification of MC that resulted in a now-out-of-date version.

As indicated at 504, similar to during the initial load, the dynamic class reloading component generates the body class MC-(i+1)-0, similar to MC-0-0 but using the bytecode from the now-modified class file for MC resulting from the developer's most recent change. MC-(i+1)-0 implements Body as well as the relevant generated interfaces corresponding to the instance methods on the latest version of MC.

As indicated at 506, similar to during the initial load, the dynamic class reloading component generates the static body class MC-(i+1)-0-S, similar to MC-0-0-S but using the newly-modified bytecode from the class file for MC. MC-(i+1)-0-S implements StaticBody as well as the relevant generated interfaces corresponding to the static methods on the latest version of MC.

As indicated at 508, the dynamic class reloading component creates a singleton instance of static body class MC-(i+

1)-0-S and sets MC.staticBody to that new instance. The dynamic class reloading component copies the values of static fields from MC-i-0 to the corresponding static fields on MC-(i+1)-0 for compatible fields. The static fields that appear on the managed class trigger the generation of same-named static fields on the non-static body class MC-i-0, so static field values need to be copied from the previous version of the body class (MC-i-0) to the new version of the body class (MC-(i+1)-0). The static body class provides an instance home (not a static home) for static methods defined on the managed class. Static methods cannot be defined in interfaces; only instance methods can. In order for the original static methods to do the type casting and then invoke a method via an interface, they need to delegate to an instance. The byte-code-transformed static methods on the managed class delegate to the corresponding instance methods on the static body class. In turn, the generated code in each of those instance methods on the static body class delegate to the corresponding generated static method on the body class. The static body class's instance methods simply delegate to the corresponding static methods on the body class. This enables every byte-code-transformed original method (static and instance) in the managed class to cast an instance of a generated target class to the correct generated interface and then invoke the generated method on the target through the interface.

As indicated at 510, the dynamic class reloading component creates, for each existing instance x of MC, a new instance of body class MC-(i+1)-0 and points x.body to that new instance of MC-(i+1)-0. The dynamic class reloading component copies the values of instance fields from each instance of MC-i-0 to the corresponding new instance of MC-(i+1)-0.

To load the created classes and interfaces, in the case of virtual machine implementations that support dynamic class redefinition, the dynamic class reloading component can leverage the standard virtual machine class loading method that requests the dynamic class reloading component to provide the generated classes and interfaces only when the VM class loader discovers a need for them. In the case of virtual machine implementations that do not support dynamic class redefinition, when the dynamic class reloading component transforms the user's managed class and generates a managed class body class version and a static body class version, the dynamic class reloading component, instead of relying on the standard virtual machine class loading method, explicitly instructs the VM class loader to load the classes and interfaces that were generated by the dynamic class reloading component.

Use of Interfaces

The use of interfaces is mentioned in several places in regards to embodiments of the dynamic class reloading component described above. In this section, the use of interfaces in these embodiments is further described. In these embodiments, a separate interface is generated for each distinct method name and signature that the developer implements on managed classes. Each generated class (e.g., MC-i-0) is declared to implement all the generated interfaces that correspond to its methods.

When loading a managed class, the dynamic class reloading component can find out the methods that are part of that class. Later versions of the managed class may or may not support the exact same set of methods. In embodiments of the dynamic class reloading component, the bytecode of managed classes is changed so that when a method on one of the managed classes, such as MC, is called, instead of invoking the method directly on the managed class, a method defined on an interface that the managed class implements is invoked. For example, a user might write a method x on a class MC. Normally, what the Java compiler does is create bytecode instructions that will invoke that method on that class when called. The dynamic class reloading component may generate an interface that has only one method on it that is named in such a way that uniquely identifies the return type of the method, the name of the method, and the arguments that are passed to the method (which may be referred to as the signature of the method). This is done for every method on every managed class.

Thus, the dynamic class reloading component generates an interface with a name that uniquely matches up with the signature. The dynamic class reloading component also generates the body class and the static body class to generate the correct set of interfaces. When the dynamic class reloading component loads a managed class, e.g. example managed class MC, it generates a static body class and instance methods defined on the static body class for every static method that is defined on the managed class. The body class has an instance method defined on it for every instance method that is defined on the managed class.

When the dynamic class reloading component is analyzing the bytecode of a managed class MC or another managed class, it look for locations where the code invokes either a static or instance method on the managed class MC. When such a location is found, the dynamic class reloading component changes the bytecode so that, instead of invoking method x on the managed class, an interface defined on either the static body class or the body class is invoked. Thus, the bytecode changes that are made by the dynamic class reloading component convert what the compiler created as a regular method invocation into an interface invocation.

Dynamic Class Reloading Component Embodiments Using Separate Class Loaders to Support Class Versioning As an alternative to the above-described embodiments of a dynamic class reloading component that generates managed class versions with different names using the managed class loader, embodiments of a dynamic class reloading component that load each version of each managed class using a separate class loader, referred to as a recyclable class loader, each associated with a particular version of a particular managed class, are described. Using a separate class loader to load each version of each managed class allows different classes that share the same name to exist in the VM. The component maintains a class loader surrogate for each actual class loader in the application that loads managed classes. The class loader surrogate is not a class loader, but rather oversees families of recyclable class loaders. In these embodiments, an interface is created for each version of each managed class which records the methods supported by that version of the class. Later versions of such interfaces are defined to extend the preceding version of the interfaces for type safety. Each different version of a managed class is declared to implement the corresponding version of the interface for the managed class. These embodiments are illustrated in FIGS. 6 through 12.

In some embodiments, the dynamic class reloading component may gain control while the VM for an application under development is being started, before the container and application are started to perform initialization tasks including one or more of, but not limited to: defining classes which are to be managed by the component and classes which are to be exempt from management; obtaining and storing VM environment information including one or more object references; and modifying one or more methods of the VM environment, including but not limited to class loader and define class methods. The component then returns control to the VM startup.

In some embodiments, the dynamic class reloading component may gain control during the define class method of a class being defined when the define class method is invoked by the class loader for the class. The component may determine if the class being defined is a managed class or an exempt class. If the class is a managed class, the dynamic class reloading component locates the class loader surrogate for the class loader, creating the class loader surrogate if none exists. The component then creates a new recyclable class loader to load the version of the class being defined. The component adds the new recyclable class loader to the family of recyclable class loaders for the class, updating the associated class loader surrogate to include the new recyclable class loader. In some embodiments, the recyclable class loader delegates to the original class loader for the class to load the bytecode for the class, augments the loaded bytecode for the class, and then invokes the define class method for the class.

In some embodiments, when a managed class is loaded, the dynamic class reloading component timestamps the class definition and records the location of the class file from which the bytecode was loaded. The bytecode of the managed class is augmented in part to perform up-to-date checks when methods of the managed class are invoked. Every invocation of a method on a managed class version may trigger an up-to-date check for the managed class version. The up-to-date check for a managed class version may compare the previously recorded load-time of the managed class version with the current last modified time from the corresponding class file. If the comparison indicates that the managed class version is no longer current, the component may check a delegate field of the managed class version to determine if the delegate field is set or null. If the delegate field is null, this indicates that a newer instance of the managed class has not been previously created for the new definition of the managed class.

If the managed class version is obsolete, the component creates a new recyclable class loader and loads the new definition of the managed class using the new recyclable class loader. For each older version of the managed class, the component redefines the older version of the managed class according to the new version of the class definition. For each field of the older version, if the field is no longer present or has changed type in the new version of the class definition, the access methods for the field are redefined to throw an exception. If the field is still present and is compatible with the new definition, the access methods on the older managed class version are redefined to delegate to the new managed class version implementations of those access methods. For each method of the older version, if there is a compatible counterpart of the method on the new definition, the method is redefined to delegate to the newest implementation of the method. If the method has no compatible counterpart, the method is redefined to throw an exception.

In some embodiments, for each instance of an older version of the managed class, the component creates a new instance of the managed class using the new definition. The component then updates the delegate field in the older managed class versions so that each older instance has a reference to a corresponding newer instance of the managed class to which the older managed class version delegates instance method invocations.

Figure 6:
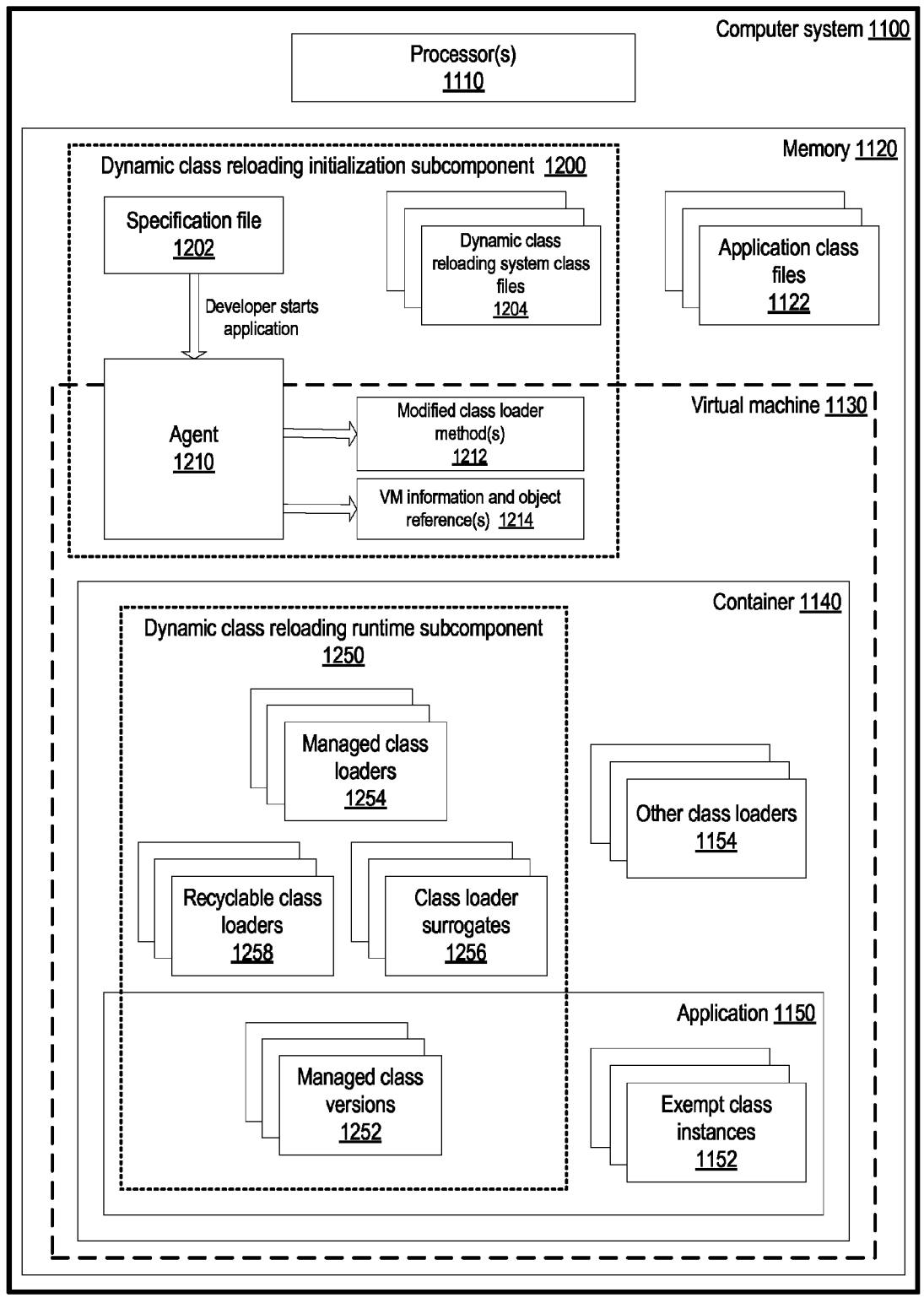
FIG. 6 illustrates an example computer system implementing a dynamic class reloading component that uses recyclable class loaders, according to one or more embodiments.

FIG. 6 illustrates an example computer system implementing a dynamic class reloading component that uses recyclable class loaders, according to one or more embodiments. Computer system 1100 may be any of various types of devices, including, but not limited to, a personal computer system, desktop computer, laptop or notebook computer, mainframe computer system, workstation, network computer, or other suitable device. In general, system 1100 may be any device with a digital heartbeat capable of performing as a development platform as described herein. System 1100 may include at least one processor 1110. The processor 1110 may be coupled to a memory 1120. Memory 1120 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 1100 may couple over a network to one or more other devices via one or more wired or wireless network interfaces.

System 1100 may include, in memory 1120, application class files 1122 for an application 1150 under development, dynamic class reloading component class files 1204, and a specification file 1202 (in Java™ technology, a JAR file) for the dynamic class reloading component. System 1100 may also include, in memory 1120, an implementation of a class-based, platform-independent programming language environment (not shown). Java™ technology is an example of such a programming language environment. An integration and development environment (IDE) for developing programs or applications in accordance with the programming language may also be included in memory. Dynamic class reloading component class files 1204 and specification file 1202 may be used in, and thus may be considered part of, dynamic class reloading initialization subcomponent 1200, which operates during startup of an application 1150 under development, as described below in relation to FIG. 7.

System 1100 may include, in memory 1120, a virtual machine 1130 (e.g., a JVM) and a container 1140 (e.g., an application server such as a Java™ EE technology application server), which may be started in response to a developer starting an application 1150 under development, as described below in relation to FIG. 7.

Once the application 1150, container 1140, and virtual machine 1130 are started, during the process of which the dynamic class reloading initialization subcomponent 1200 may perform several tasks as described below in relation to FIG. 7, memory 1120 may be viewed as including an instance of dynamic class reloading runtime subcomponent 1250, as described below in relation to FIGS. 8 through 12. Runtime subcomponent 1250 may be viewed as extending across a portion of the container 1140 and the application 1150.

Runtime subcomponent 1250 may include, but is not limited to, managed class loaders 1254, class loader surrogates 1256, recyclable class loaders 1258, and managed class versions 1252. Managed class versions 1252 are instances of classes that are managed by the dynamic class reloading component (i.e., that are managed classes). Container 1140 and application 1150 may also include other class loaders 1154 and exempt class instances 1152. Note that an instance 1152 of an exempt class may be loaded by either one of the other class loaders 1154 or by one of managed class loaders 1254. A managed class loader 1254 is a class loader that is responsible for loading at least one managed class. However, a managed class loader 1254 may load one or more other classes that are not managed (i.e., that are exempt classes). Other class loaders 1154 are thus any class loader in the system that is not responsible for loading any managed class according to the dynamic class reloading component. Note, however, that, during operation of other class loaders 1154 in the VM 1130, runtime logic of the dynamic class reloading component (e.g., logic inserted into the VM's class loaders during initialization of the dynamic class reloading component) may be executed, for example to check if a class being loaded is a managed class or an exempt class.

A class loader surrogate 1256 is not itself an actual class loader, but rather oversees families of recyclable class loaders 1258 of the dynamic class reloading component. In some embodiments, as described below in relation to FIG. 9a, there may be a one-to-one relationship between managed class loaders 1254 and class loader surrogates 1256. That is, each managed class loader 1254 may have a single associated class loader surrogate 1256 that is responsible for tracking and otherwise managing classes loaded by its corresponding managed class loader 1254.

It is contemplated that some embodiments may be implemented using a single instance of computer system 1100, while in other embodiments multiple such systems, or multiple nodes making up computer system 1100, may be configured to host different portions or instances of embodiments. For example, in some embodiments some elements may be implemented via one or more nodes of computer system 1100 that are distinct from those nodes implementing other elements.

Figure 7:
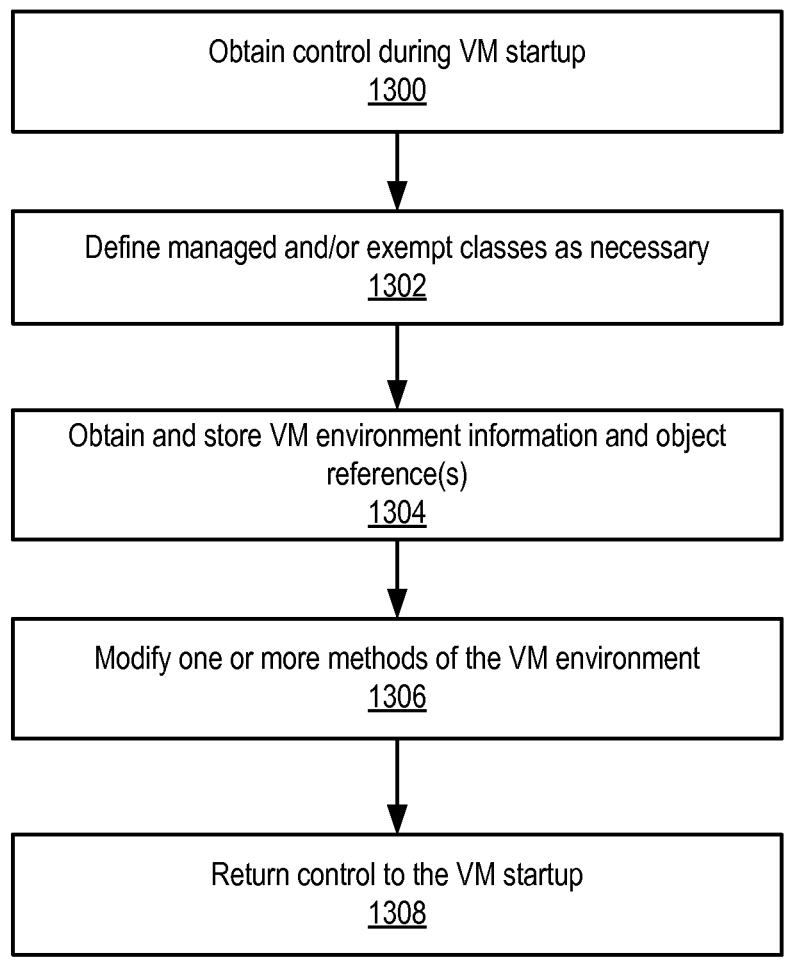
FIG. 7 illustrates a method for initializing a dynamic class reloading component that uses recyclable class loaders for an application under development according to one or more embodiments.

FIGS. 7 through 12 and the discussions thereof describe aspects and operations of some embodiments of a class reloading and versioning method and apparatus that uses recyclable class loaders, with reference to FIG. 6. In general, the dynamic class reloading component can be viewed as including an initialization subcomponent 1200 and a runtime subcomponent 1250, as illustrated in FIG. 6. The initialization subcomponent 1200 performs tasks during initialization of the VM 1130, before the container 1140 and application 1150 under development are started. FIG. 7 is specifically directed at operations of the initialization subcomponent 1200. The runtime subcomponent 1250 performs tasks during execution of the application 1150 under development in the container 1140 to perform the runtime dynamic class reloading and versioning for managed classes of the application 1150. FIGS. 8 through 12 are directed at operations of the runtime subcomponent 1250.

While embodiments are illustrated and described that include an initialization component that performs several tasks during startup of the VM made necessary because the VM environment may not directly support the dynamic class reloading component, embodiments are possible in which at least some of these initialization tasks may not be necessary. For example, a VM development environment may be pre-configured to support some features described herein as being implemented during the initialization phase by the initialization component, thus making it unnecessary to perform at least a portion of the initialization tasks. For example, it is possible that a VM development environment may be preconfigured to support implementations of the class loader that are configured to perform similarly to the modified class loader described herein in relation to embodiments, which in some embodiments are so modified during the initialization phase of the dynamic class reloading component.

Initialization Subcomponent in Embodiments Using Separate Class Loaders

FIG. 7 illustrates a method for initializing a dynamic class reloading component that uses recyclable class loaders for an application under development according to one or more embodiments. The method of FIG. 7 may be implemented by an initialization subcomponent of the dynamic class reloading component, for example initialization subcomponent 1200 of FIG. 6, and discussion of the method may refer to various elements of FIG. 6.

As indicated at 1300, the dynamic class reloading initialization subcomponent may obtain control during startup of the VM, before the container 1140 (e.g., an application server) and application 1150 are started. In some embodiments, the classes 1204, methods, and possibly other data and information used by the dynamic class reloading component may be specified in a specification file 1202, for example, in Java™ technology, a Java™ Archive (JAR) file. In some embodiments, to invoke the dynamic class reloading component for an application 1150 under development, the developer specifies the dynamic class reloading component specification file 1202 (e.g., a JAR file) on the command line when starting the VM 1130 for the application 1150. In some embodiments, the developer may also specify one or more options or variables for the dynamic class reloading component on the command line.

Class reloading and versioning may be most effective when it is transparent, requiring changes in neither the application class files 1122 the developer writes nor the container 1140 logic itself. In some embodiments, the dynamic class reloading component may be initialized by an agent 1210, e.g. a Java™ agent. In Java™ technology, a Java™ agent 1210 typically gains control because the Java™ command line specifies the -javaagent option, specifying the JAR file 1202 that contains the agent. The VM 1130, not the developer's application 1150 or the container 1140, loads and starts the Java™ agent 1210. This allows the dynamic class reloading component to function without the application 1150 or the container 1140 being aware of its presence and without requiring changes to either the application 1150 or the container 1140 to provide support for the dynamic class reloading component.

In some embodiments, loading instructions for the agent 1210 may be defined in dynamic class reloading component specification file 1202, with class definitions for the agent 1210 in one or more dynamic class reloading component class files 1204. In some embodiments in a Java™ environment, a Java™ command line option on the command line used to start an application under development in a VM environment may be used to invoke the dynamic class reloading component for the application under development. In some embodiments, the command line option may be the -javaagent command line option specifying the dynamic class reloading component JAR file 1202. The following is an example of such a command line option:

-javaagent:<path to dynamic class reloading component JAR file>

This Java™ command line option instructs the VM 1130, during initialization before starting the container 1140 and application 1150, to run a Java™ agent 1210, and specifies where to find the classes for the agent 1210 (i.e., the path to the JAR file 1202).

As indicated at 1302, the dynamic class reloading initialization subcomponent may define managed and/or exempt classes for the application under development as necessary. In some embodiments, as part of the -javaagent option, a string may be appended for use by the Java™ agent 1210. The following is an example of the -javaagent command line option with optional string:

-javaagent:<JAR path>[=<options>]

In some embodiments, the dynamic class reloading component may be configured to automatically exempt certain classes from being managed (such as its own classes as well as those in packages that, for example, start with java, javax, sun, etc.). In some embodiments, the optional string may be used to extend this list to include other package prefixes representing additional exempt classes 1152, that is classes that are not to be managed according to the dynamic class reloading methods described herein, and/or to specify classes, even in the class packages exempted by default, that are to be managed. Thus, in some embodiments, the dynamic class reloading component may allow the user to specify particular classes which are to be managed in an otherwise exempted class package and/or to specify particular classes which are not to be managed in an otherwise managed class package. The following is an example of the -javaagent command line option with optional string including examples of exclude and include commands to be interpreted by the Java™ agent 1210:

-javaagent:<JAR path>[=exclude=<class specifications> include=<class specifications>]

In some embodiments, [=<options>] may be used by the developer to specify other options or parameters to the dynamic class reloading component agent 1210.

As indicated at 1304, the dynamic class reloading initialization component may obtain and store VM environment information and object reference(s). Some embodiments of the dynamic class reloading component may employ an agent 1210, e.g. a Java™ agent, to perform one or more initialization tasks. In some embodiments, one of these initialization tasks is to obtain VM environment information and object reference(s) 1214. In Java™ technology, the ability to redefine a previously loaded class may be provided in part by a java.instrumentation.Instrumentation object that the JVM 1130 creates. A method by which Java™ code can obtain an instance of such an object is by providing a Java™ agent 1210 which gains control early in the life cycle of the VM 1130, after the VM 1130 has started but before the VM 1130 has started the container 1140 logic or the developer's application 1150. Thus, in some embodiments, a Java™ agent 1130 of the dynamic class reloading component, invoked by a command line option, stores a reference to the JVM-provided Instrumentation object so that runtime subcomponent 1250 of the dynamic class reloading component can use it. In some embodiments, the Java™ agent 1210 may obtain and store other object references and/or other information about the VM 1130 environment for use by the dynamic class reloading component.

As indicated at 1306, the dynamic class reloading initialization subcomponent may modify one or more methods of the VM environment, In some embodiments, the invoked Java™ agent 1210 may redefine the Java™ class loader (java-.lang.ClassLoader) object to generate one or more modified class loader method(s) 1212, as described below in the section titled Redefining the class loader in embodiments using separate class loaders.

A Java™ agent 1210 may thus be used by the dynamic class reloading component during initialization to achieve transparency, to obtain information including an object reference to the Instrumentation object from the JVM 1130, and to redefine the Java™ class loader. In some embodiments, a Java™ agent may be used to perform one or more other tasks.

As indicated at 1308, once finished with the initialization tasks for the dynamic class reloading component, the dynamic class reloading initialization subcomponent may return control to the VM startup.

Redefining the Class Loader in Embodiments Using Separate Class Loaders

One of the java.lang.ClassLoader.defineClass methods runs for any class being defined in the JVM 1130. Of the several variants of defineClass, some delegate to others. Two variants of defineClass invoke native code, which actually defines a class. An embodiment of a dynamic class reloading initialization subcomponent of the dynamic class reloading component may modify or augment the default class loader method(s) by adding bytecode instructions to at least these two defineClass methods so that, during runtime, the modified class loader method(s) 1212 invoke a method of the dynamic class reloading component which first detects whether a class being defined is a managed class or an exempt class, for example according to the list of exempt package prefixes provided by the dynamic class reloading component and optionally modified by the user. If the class is exempt, then the bytecode instructions added by the dynamic class reloading component returns immediately and the unmodified remainder of the ClassLoader.defineClass method runs, thus defining the class normally. If, however, the bytecode instructions added by the dynamic class reloading component concludes that the class is a managed class, then the bytecode instructions may perform additional processing as described below.

Runtime Subcomponent in Embodiments Using Separate Class Loaders

JVM technology generally permits only one class of a given name to be loaded by a single class loader. Normally, in typical Java™ applications and in application servers, a single class loader loads many classes because versioning is not required. Embodiments of the dynamic class reloading component load each version 1252 of each managed class using a separate class loader provided by the dynamic class reloading component. These separate class loaders, each associated with a particular version 1252 of a particular managed class, are referred to herein as recyclable class loaders 1258. This allows different classes that share the same name to exist in the JVM 1130, as is required for handling managed class versioning as described herein.

In some embodiments, the dynamic class reloading component maintains a class loader surrogate 1256 for each actual class loader 1254 in the application that loads managed classes 1242. The class loader surrogate 1256 is not itself an actual class loader, but rather oversees families of recyclable class loaders 1258 of the dynamic class reloading component. Each recyclable class loader 1258 loads a single version of a single managed class. Each family of recyclable class loaders 1258 represents all the recyclable class loaders 1258 that have loaded versions of the same class. The class loader surrogate 1256 may be considered a bridge between the original managed class loader 1254 for one or more managed classes and the dynamic class reloading component-provided recyclable class loaders 1258 that load the various versions 1252 of the one or more managed classes that the original class loader 1254 would normally own.

Figure 8:
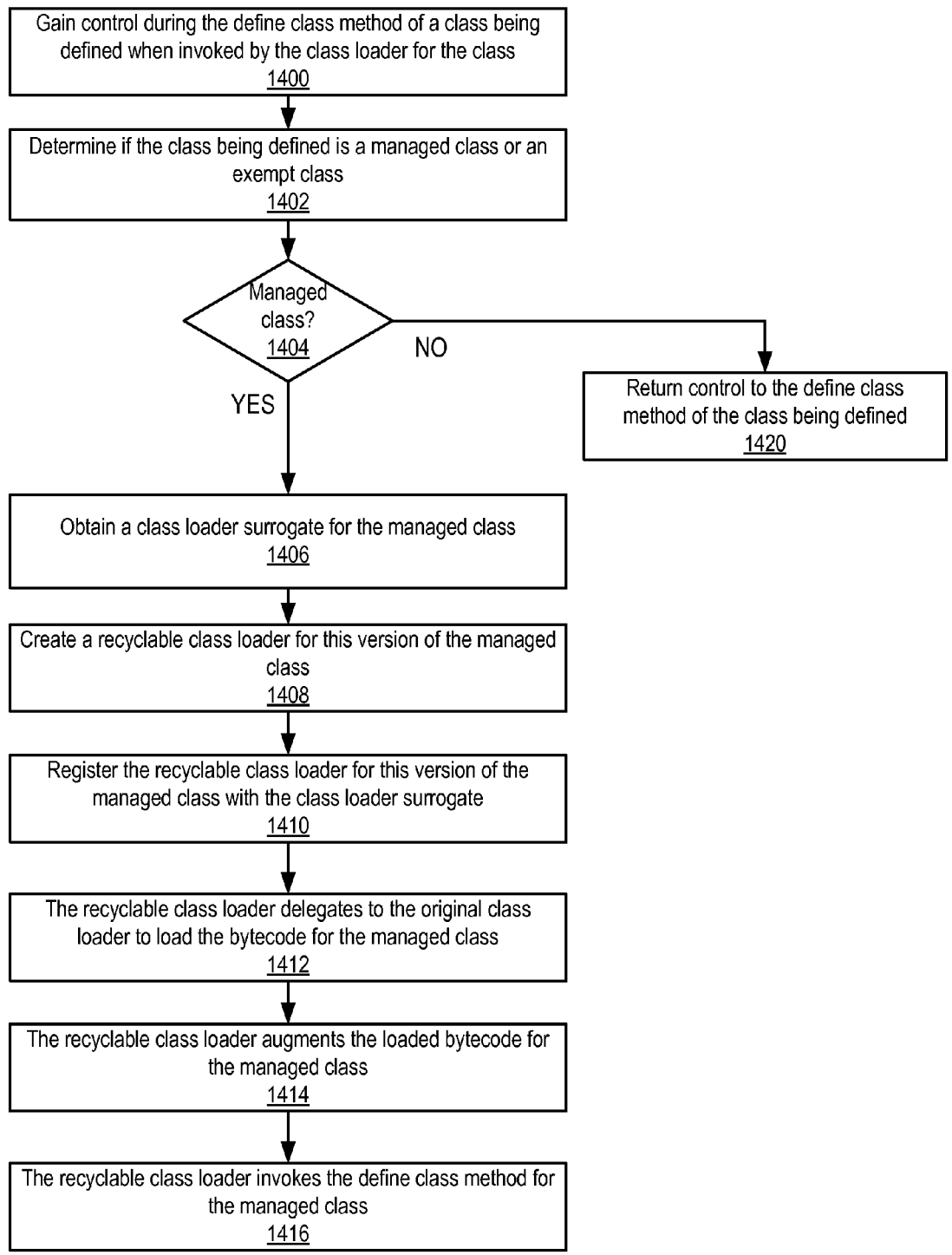
FIG. 8 illustrates a method for loading managed classes during runtime of an application under development according to one or more embodiments.

FIG. 8 illustrates a method for loading managed classes during runtime of an application under development according to one or more embodiments. The method of FIG. 8 may be implemented by a runtime subcomponent of the dynamic class reloading component, for example runtime subcomponent 1250 of FIG. 6, and discussion of the method may refer to various elements of FIG. 6.

As indicated at 1400, the dynamic class reloading component may gain control during the define class method of a class being defined when the define class method is invoked by the class loader for the class. In some embodiments, the component may gain control via modifications made to the VM's class loader method(s) during the initialization of the dynamic class reloading component. As indicated at 1402, the dynamic class reloading component may determine if the class being defined is a managed class or an exempt class. At 1404, if the class being defined is an exempt class, then the dynamic class reloading component returns control to the define class method of the class being defined, as indicated at 1420, so that the class can be defined as normal.

At 1404, if the class being defined is a managed class, the dynamic class reloading component may perform several tasks as indicated at 1406 through 1416. As indicated at 1406, the dynamic class reloading component may obtain a class loader surrogate for the managed class. In some embodiments, when the dynamic class reloading component intercepts the define class method (e.g., via modifications made to the VM's class loader method(s) during the initialization of the dynamic class reloading component) and determines that the class being defined is a managed class, the dynamic class reloading component locates the class loader surrogate 1256 for the loading managed class loader 1254, creating the class loader surrogate 1256 if none exists. As indicated at 1408, the dynamic class reloading component then creates a new recyclable class loader 1258 to load the version 1252 of the managed class being defined. As indicated at 1410, the dynamic class reloading component adds the new recyclable class loader 1258 to the family of recyclable class loaders 1258 for the class being defined, updating the associated class loader surrogate 1256 appropriately to include the new recyclable class loader 1258.

Figure 9A:
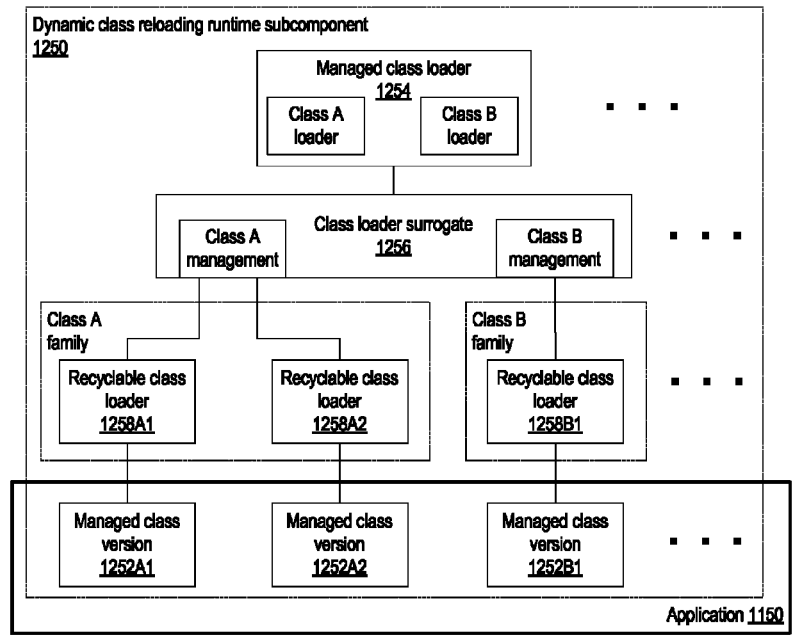
FIGS. 9a and 9b illustrate a managed class loader and its associated class loader surrogates and recyclable class loaders according to one or more embodiments.

FIG. 9*a* illustrates a managed class loader and its associated class loader surrogate and recyclable class loaders according to one or more embodiments. A managed class loader 1254 is the class loader originally responsible for loading one or more classes in application 1150. In this example, managed class loader 1254 is the original class loader for class A and class B. Recyclable class loaders 1258 are class loaders in the dynamic class reloading component that are each responsible for loading a single version of a single class of managed class loader 1254.

A class loader surrogate 1256 is not itself an actual class loader, but rather manages a family or families of recyclable class loaders 1258 associated with a managed class loader 1254. Each recyclable class loader 1258 is responsible for loading a single version of a single managed class of managed class loader 1254. Each family of recyclable class loaders 1258 (in FIG. 9*a*, class A family and class B family) represents all the recyclable class loaders 1258 that have each loaded a different version of the same class. The class loader surrogate 1256 may be considered a bridge between the original managed class loader 1254 for the managed classes and the recyclable class loaders 1258 that load the various versions 1252 of the one or more managed classes that the original managed class loader 1254 would normally own.

Figure 9B:
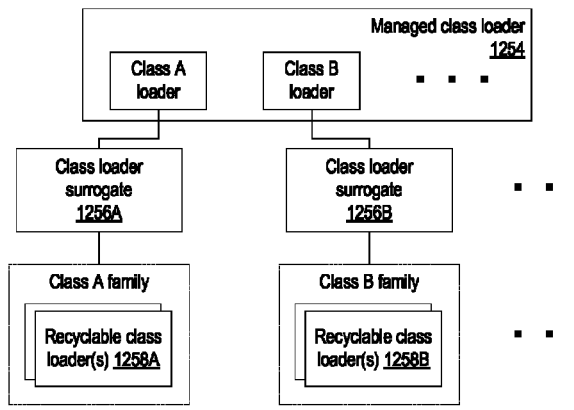

FIG. 9*b* illustrates a managed class loader and its associated class loader surrogates and recyclable class loaders according to one or more embodiments. While the embodiment of FIG. 9*a* illustrates a managed class loader with a single class loader surrogate 1254 responsible for all managed classes of the managed class loader, and thus as managing both class A family and class B family, in another embodiment, each class loader surrogate 1254 may manage only a single managed class and family of the class, as illustrated in FIG. 9*b*.

As indicated at 1412 of FIG. 8, the recyclable class loader 1258 delegates to the original class loader 1254 to load the bytecode for the managed class. An instance of a recyclable class loader 1258 should be the class loader to actually invoke the define class method for the class being loaded, because that is how the JVM 1130 assigns the owning class loader for each class. However, it is the original managed class loader 1254 that knows where the class definition of the managed class resides (e.g., in application class files 1122 in FIG. 6) and how to load the managed class's bytecode. Thus, in some embodiments, a newly created recyclable class loader 1258 delegates back to the original managed class loader 1254 to obtain the bytecode that represents the managed class. In FIG. 9*a*, for example, after recyclable class loader 1258B1 is initially created, recyclable class loader 1258B1 delegates back to original managed class loader 1254 to obtain the bytecode for class B. Class B loader portion of managed class loader 1254 loads the bytecode for managed class B. Control then returns to recyclable class loader 1258B1.

As indicated at 1414 of FIG. 8, after obtaining the bytecode that represents the managed class by delegating to the original managed class loader 1254, the recyclable class loader 1258 augments the retrieved bytecode for the managed class. See the section Augmenting the bytecode of managed classes in embodiments using separate class loaders for a description of augmenting a class's bytecode according to one or more embodiments. As indicated at 1416, the recyclable class loader 1258 then invokes the define class method for the managed class, which in the Java™ environment is the java.lang.ClassLoader.defineClass method.

The modification that the dynamic class reloading component makes to the bytecode for the define class method differentiates between an invocation from a recyclable class loader 1258 and an invocation from the original managed class loader 1254 to avoid an infinite loop. If the class loader invoking the define class method is a recyclable class loader 1258, or if the class being defined is a not managed class, then the original bytecode of the define class method executes to define the class, rather than delegating to the dynamic class reloading component.

In some embodiments, when a managed class is loaded by the dynamic class reloading component, the dynamic class reloading component timestamps the class definition with a current time and records the location of the class file 1122 from which the bytecode was loaded.

The approach of using bytecode redefinition to intercept key method invocations in the class loader method (in Java™ technology, java.lang.ClassLoader) allows embodiments of the dynamic class reloading component to provide recyclable class loaders 1258 for defining managed classes without requiring any changes in the application 1150, the container 1140, or the VM 1130 and platform-independent programming language (e.g., Java™) classes, other than the transformation and augmentation to the bytecode that the dynamic class reloading component itself introduces.

The section Detecting and handling obsolete classes describes additional tasks that embodiments of the dynamic class reloading component may perform when redefining a previously-defined managed class.

Augmenting the Bytecode of Managed Classes in Embodiments Using Separate Class Loaders To implement class versioning, embodiments may augment the bytecode of each managed class. In some embodiments, each constructor that does not invoke another constructor of the same managed class registers the new instance of the managed class with the dynamic class reloading component. This provides the dynamic class reloading component with a complete record of the population of versions 1252 of each managed class. In some embodiments, the dynamic class reloading component may add access methods (e.g., a setter and a getter method) for each field defined on the managed class. A getter method is a method that "gets" the field, i.e. that returns, the value of the field. A setter method is a method that "sets" the field, i.e. that accepts as an argument a value for the field and sets the field to that value. Collectively, the getter and setter methods may be referred to as access methods. In some embodiments, the dynamic class reloading component may add one or more private fields to each managed class. The one or more private fields may be used, for example, in delegating control to a latest version of the managed class. In some embodiments, each invocation of a method on a managed class version 1252 triggers dynamic class reloading component-provided logic to check whether the managed class version 1252 is up-to-date (the latest version). If the managed class is not up-to-date, the up-to-date check may alter the one or more private fields of the managed class version 1252 to indicate that the managed class's methods should delegate to the latest version 1252 of the managed class. In some embodiments, bytecode that refers directly to a field defined on a managed class version 1252 may be replaced by bytecode that invokes the corresponding access method (i.e., setter or getter method) to get or set the value of the field from the latest managed class version 1252.

Figure 10:
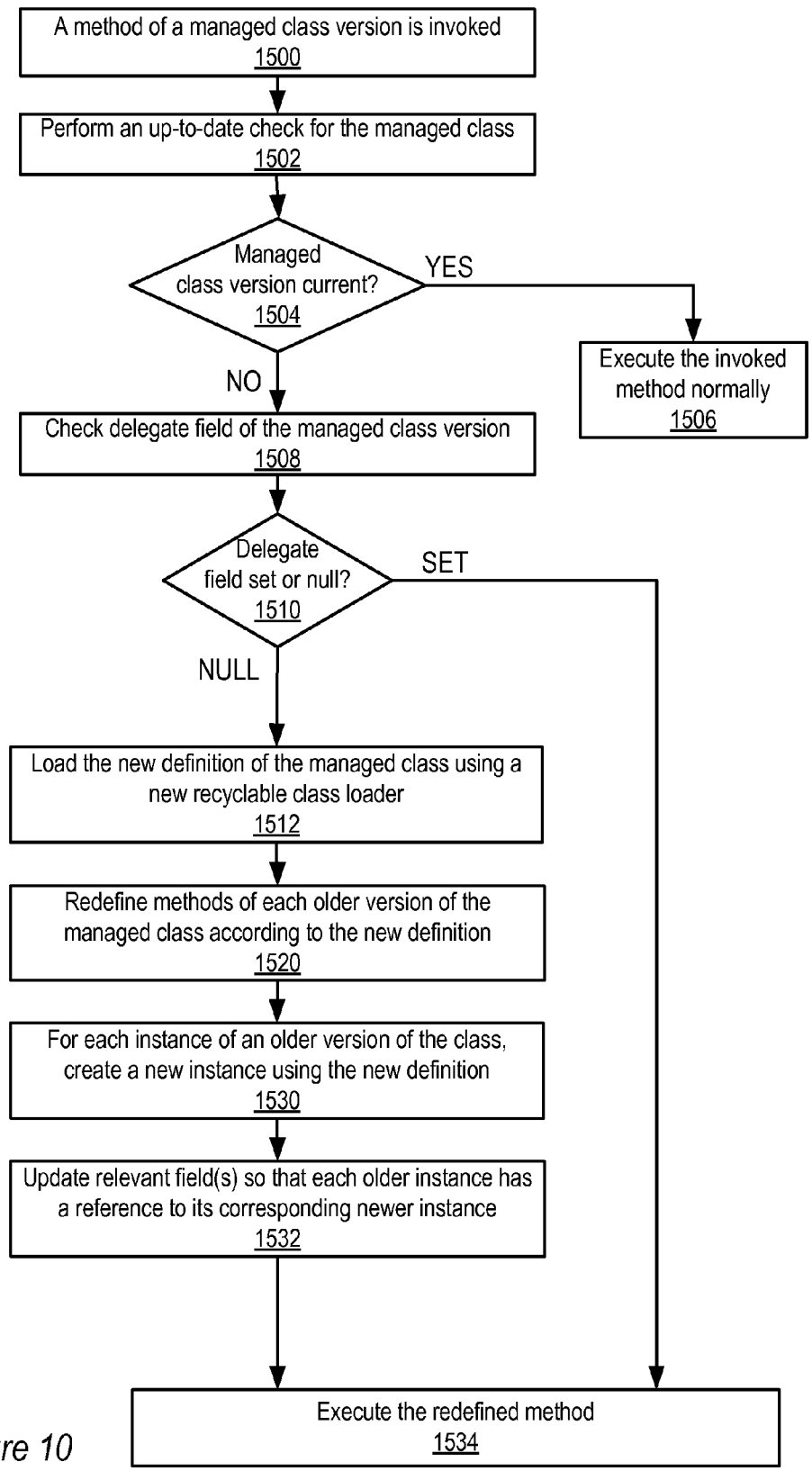
FIG. 10 illustrates a method for the dynamic versioning of managed classes during runtime of an application under development according to one or more embodiments.

Detecting and Handling Obsolete Classes in Embodiments Using Separate Class Loaders FIG. 10 illustrates a method for the dynamic versioning of managed classes during runtime of an application under development according to one or more embodiments. The method of FIG. 10 may be implemented by a dynamic class reloading runtime subcomponent of the dynamic class reloading component, for example runtime subcomponent 1250 of FIG. 6, and discussion of the method may refer to various elements of FIG. 6.

In some embodiments of the dynamic class reloading component, when a managed class is loaded, the dynamic class reloading component timestamps the class definition and records the location of the class file 1122 from which the bytecode was loaded. The bytecode of the managed class is augmented in part to perform up-to-date checks when methods of the managed class are invoked. In some embodiments, every invocation of a method on a managed class version 1252 may trigger an up-to-date check for the managed class version 1252. As indicated at 1500, a method of a managed class version is invoked. The method may be a getter or setter method for a field or some other method that was added by the dynamic class reloading component, or any of the other methods of the managed class. As indicated at 1502, an up-to-date check for the managed class is performed. As part of the dynamic class reloading component's up-to-date check for the managed class, the dynamic class reloading component compares the previously recorded load-time of the managed class version 1252 with the current last modified time from the corresponding class file 1122, for example using the lastModified( ) method of Java™ to get the last modified time for the class file. If the in-memory managed class version 1252 is still current, the load-time of the managed class version 1252 will be later than the current last modified time of the corresponding class file 1122. If the developer has modified the class file 1122, the current last modified time of the class file 1122 will be later than the load-time of the managed class version 1252, and thus the managed class version 1252 is obsolete. Note that it is also possible that the class file 1122 no longer exists, which indicates that the managed class has been removed from the application 1150, and thus the managed class version 1252 is obsolete.

At 1504, if the in-memory managed class version 1252 is still current (that is, if the class file 1122 exists and the load-time of the managed class version 1252 is later than the current last modified time of the corresponding class file 1122), then in some embodiments the dynamic class reloading component makes no changes in the managed class and the up-to-date check returns immediately. The rest of the bytecode in the invoked method may then be executed normally, as indicated at 1506.

At 1504, if the timestamp comparison indicates that the in-memory managed class version 1252 is no longer current relative to the last modified time of the class file 1122 (i.e., is obsolete), the dynamic class reloading component may check the delegate field of the managed class version to determine if the delegate field is set or null, as indicated at 1508. In some embodiments, when an instance of a managed class is created, a delegate field (or fields) is added to the class. The delegate field may be initialized to null or to some other value that indicates that there is initially no newer instance of the class to which the instance is to delegate.

At 1510, if the delegate field is null, this indicates that a newer instance of the managed class has not been previously created for the new definition of the managed class. In some embodiments, the dynamic class reloading component loads the new definition of the managed class using a new recyclable class loader 1258, as indicated at 1512. In some embodiments, the new recyclable class loader 1258 is registered with the class loader surrogate 1256 for the managed class. In some embodiments, the new recyclable class loader 1250 may delegate to the original class loader 1254 to load the bytecode for the managed class, augment the loaded bytecode for the managed class, and invoke the define class method for the managed class. For further discussion, see elements 1406 through 1416 of FIG. 8 and the description thereof.

Figure 11:
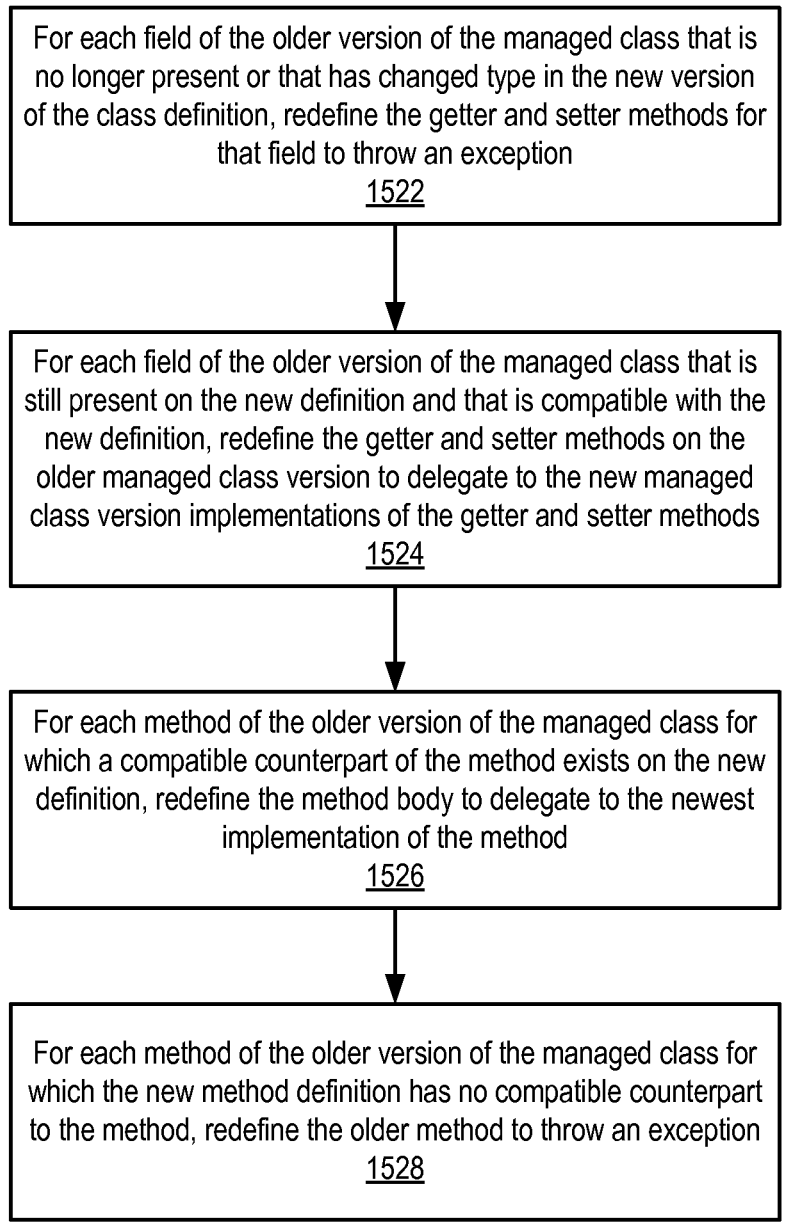
FIG. 11 illustrates a method of redefining an older version of a managed class according to a new version of the class definition according to one or more embodiments.

In some embodiments, for each older version 1252 of the managed class, the dynamic class reloading component may alter or redefine the older version 1252 of the managed class according to the new version of the class definition, as indicated at 1520. FIG. 11 illustrates a method of redefining an older version of a managed class according to a new version of the class definition, according to one or more embodiments. In some embodiments, the dynamic class reloading component may compare the older version 1252 of the managed class's fields and methods to the new version of the class definition. In some embodiments, for each field of the older version 1252 of the managed class that is no longer present or that has changed type in the new version of the class definition, the dynamic class reloading component may redefine the access methods (i.e., the getter and setter methods) that were added for that field in the older version 1252 of the managed class to throw an exception indicating that an obsolete field has been accessed, as indicated at 1522. In some embodiments, for each field of the older version 1252 of the managed class that is still present on the new definition and that is compatible with the new definition, the dynamic class reloading component redefines the access methods (getter and setter methods) on the older managed class version 1252 to delegate to the new managed class version 1252 implementations of those access methods, as indicated at 1524.

The dynamic class reloading component may apply similar logic to each method on the older version 1252 of the managed class. In some embodiments, for each method of the older version 1252 of the managed class for which a compatible counterpart of the method exists on the new definition, the dynamic class reloading component redefines the method body to delegate to the newest implementation of the method, as indicated at 1526. In some embodiments, for each method of the older version 1252 of the managed class for which the new method definition has no compatible counterpart to the method, the dynamic class reloading component redefines the older, obsolete method to throw an exception, as indicated at 1528.

Returning to FIG. 10, as indicated at 1530, for each instance of an older version of the managed class, the dynamic class reloading component creates a new instance of the managed class using the new definition. As indicated at 1532, the dynamic class reloading component then updates the delegate field or fields that were added to the older managed class versions 1252 so that each older instance has a reference to a corresponding newer instance of the managed class. It is this corresponding newer instance of the managed class to which an older managed class version 1252 delegates instance method invocations for which there are corresponding definitions in the newer instance. If there is no corresponding definition for a method (i.e., if the field or method has been removed from the class), then the method has been redefined to throw an exception.

Figure 12:
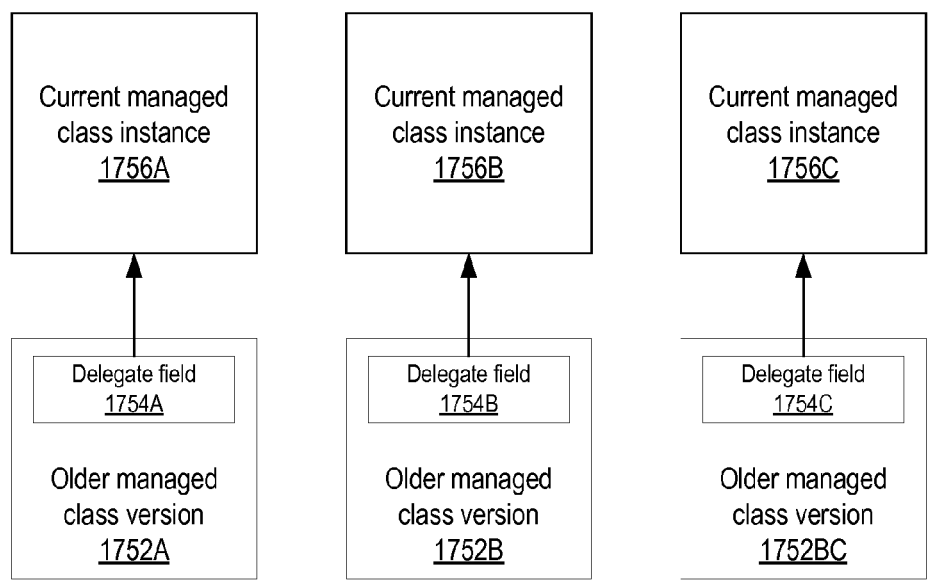
FIG. 12 illustrates older versions of a managed class that delegate to new instances of the managed class according to one or more embodiments.

FIG. 12 illustrates older versions of a managed class that delegate to new instances of the managed class according to one or more embodiments. In some embodiments, when an instance of a managed class is created, a delegate field 1754 (or fields) is added to the class. The delegate field 1754 may be initialized to NULL or to some other value that indicates that there is initially no newer instance of the class to delegate to. When a new definition for a managed class is detected, for example via an up-to-date check invoked by a method invocation on a version 1252 of a managed class, the dynamic class reloading component loads a new version of the class. After the new version of the class has been loaded, but before returning control back to the method that triggered the up-to-date check, the dynamic class reloading component examines the population of all instances 1752 of all old versions of the same class. The dynamic class reloading component creates a new instance 1756 of the managed class for each of the old instances 1752 of the managed class. The instances of the new class 1756 are the stand-in or superseding instances for instances 1752 created under older versions of the class. For each of those older instances 1752, the dynamic class reloading component sets the delegate reference 1754 to point to the corresponding new instance 1756 that was created.

Returning to FIG. 10, at 1510, if the delegate field is set (not null), this indicates that a corresponding newer instance of the managed class has been previously created, and the field is set to reference that newer instance. Therefore, the invoked method, which has previously been redefined, is allowed to continue, as indicated at 1534.

Returning to FIG. 10, in some embodiments, after performing the appropriate tasks for the older version(s) 1252 of the managed tasks in response to detecting that the version(s) are obsolete, the now redefined bytecode of the method which triggered the up-to-date check for the managed class may be executed, as indicated at 1534. If a compatible counterpart exists on the new definition of the managed class indicated by the delegate field, then the modified method body delegates to the new implementation (i.e., to the appropriate new instance 1756 of the managed class, as indicated in FIG. 12). Otherwise, the now-obsolete method throws an exception.

As previously noted, it is possible that the class file no longer exists when the up-to-date check is performed at 1502. In some embodiments, if the class file 1122 no longer exists, for each existing version 1252 of the managed class, the dynamic class reloading component may alter or redefine the in-memory version(s) 1252 of the managed class, which are now all obsolete. In some embodiments, the dynamic class reloading component may redefine the getter and setter methods that were added for the fields in each version 1252 of the managed class to throw an exception. In some embodiments, for each method on each version 1252 of the managed class, the method may be redefined so that the now-obsolete method throws an exception. In some embodiments, for each instance of an obsolete version of the managed class, the dynamic class reloading component creates a new instance of the managed class. The dynamic class reloading component then updates the delegate field or fields that were added to the obsolete managed class versions 1252 so that each obsolete instance has a reference to a corresponding newer instance of the managed class. It is this corresponding newer instance of the managed class to which an obsolete managed class version 1252 delegates instance method invocations for the obsolete class. Note that other embodiments may use other techniques to handle obsolete classes (i.e., classes for which the class file(s) 1122 no longer exist).

Minimizing Heap Growth

Embodiments of the class reloading and versioning system described herein may have the potential for significant growth of the heap. As a developer recompiles managed classes, the dynamic class reloading component may tend to create more and more class definitions and instances of those class definitions. To help control growth of the heap, some embodiments of the dynamic class reloading component may use weak reference (WeakReference, in Java™) objects to allow a garbage collection mechanism of the VM to reclaim older class definitions that are no longer needed and instances of those older class definitions that are no longer reachable.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
at least one processor; and
a memory storing program instructions executable by the at least one processor to implement a dynamic class reloading component configured to:
determine that a currently loaded version of a class in a running application is not current with a class definition of the class in a class file, wherein the class definition specifies a new version of the class; and
in response to said determine:
generate a new version of a body class for the class and a new version of a static body class for the class using bytecode from the class file, wherein the new versions of the body class and the static body class are given unique names, wherein the body class implements instance methods of the class according to the class definition of the class in the class file, and wherein the static body class implements static methods of the class according to the class definition of the class in the class file;

generate an instance of the new version of the static body class and set a static body class field of the class to refer to the instance of the new version of the static body class;

for each existing instance of the class, generate an instance of the new version of the body class and set a body class field of the existing instance of the class to the corresponding instance of the new version of the body class; and load the new version of the class corresponding to the class definition of the class in the class file via a class loader for the class.

2. The system as recited in claim 1, wherein, after said determine that a currently loaded version of a class is not current with a class definition of the class in a class file, the dynamic class reloading component is further configured to record date/time information for the class file corresponding to the class.

3. The system as recited in claim 1, wherein, after said determine that a currently loaded version of a class is not current with a class definition of the class in a class file, the dynamic class reloading component is further configured to generate an interface for each method of the class for which an interface has not previously been generated, wherein the body class implements the interfaces for instance methods of the class, and wherein the static body class implements the interfaces for static methods of the class.

4. The system as recited in claim 1, wherein the dynamic class reloading component is configured to load an initial version of the class according to an initial class definition of the class prior to said determine that a currently loaded version of the class is not current with the class definition of the class in the class file, wherein, to load an initial version of the class, the dynamic class reloading component is configured to:

record date/time information for the class file corresponding to the class;

generate an interface for each method of the class according to the initial class definition of the class;

generate an initial version of the body class and an initial version of the static body class according to the initial class definition of the class using bytecode from the class file, wherein the body class and the static body class are given unique initial names;

transform bytecode of the class; and load the initial version of the class via the class loader for the class.

5. The system as recited in claim 4, wherein, to transform bytecode of the class, the dynamic class reloading component is configured to:

add the static body class field to the class and initialize the static body class field to refer to an instance of the initial version of the static body class;

add the body class field to the class;

alter the bytecode for each static method by inserting bytecode to check that the body class and the static body class are up-to-date with respect to the class file for the class and by inserting bytecode to delegate to the same-named instance method on the current static body class cast to the interface which the dynamic class reloading component generated for that method;

alter the bytecode for each instance method by inserting bytecode to check that the body class and the static body class are up-to-date with respect to the class file for the class and by inserting bytecode to delegate to the same-named instance method on the current body class cast to the interface which the dynamic class reloading component generated for that method; and alter the bytecode at each place that a method on a different class managed by the dynamic class reloading component is invoked by inserting bytecode to check that a currently loaded instance of the different class is up-to-date with respect to the class file for the different class.

6. The system as recited in claim 1, wherein the dynamic class reloading component is configured to determine that a currently loaded version of a class is not current with a class definition of the class in a class file in response to an invocation of a method of a currently loaded instance of the class.

7. The system as recited in claim 1, wherein, to determine that a currently loaded version of a class is not current with a class definition of the class in a class file, the dynamic class reloading component is configured to determine that the currently loaded version of the class was loaded prior to a last modified time of the class file.

8. A computer-implemented method, comprising:

determining that a currently loaded version of a class in a running application is not current with a class definition of the class in a class file, wherein the class definition specifies a new version of the class; and in response to said determining:

generating a new version of a body class for the class and a new version of a static body class for the class using bytecode from the class file, wherein the new versions of the body class and the static body class are given unique names, wherein the body class implements instance methods of the class according to the class definition of the class in the class file, and wherein the static body class implements static methods of the class according to the class definition of the class in the class file;

generating an instance of the new version of the static body class and setting a static body class field of the class to refer to the instance of the new version of the static body class;

for each existing instance of the class, generating an instance of the new version of the body class and setting a body class field of the existing instance of the class to the corresponding instance of the new version of the body class; and loading the new version of the class corresponding to the class definition of the class in the class file via a class loader for the class.

9. The computer-implemented method as recited in claim 8, wherein, after said determining that a currently loaded version of a class is not current with a class definition of the class in a class file, the method further comprises recording date/time information for the class file corresponding to the class.

10. The computer-implemented method as recited in claim 8, wherein, after said determining that a currently loaded version of a class is not current with a class definition of the class in a class file, the method further comprises generating an interface for each method of the class for which an interface has not previously been generated, wherein the body class implements the interfaces for instance methods of the class, and wherein the static body class implements the interfaces for static methods of the class.

11. The computer-implemented method as recited in claim 8, further comprising loading an initial version of the class according to an initial class definition of the class prior to said determining that a currently loaded version of the class is not current with the class definition of the class in the class file, wherein, said loading an initial version of the class comprises:
   recording date/time information for the class file corresponding to the class;
   generating an interface for each method of the class according to the initial class definition of the class;
   generating an initial version of the body class and an initial version of the static body class according to the initial class definition of the class using bytecode from the class file, wherein the body class and the static body class are given unique initial names;
   transforming bytecode of the class; and
   loading the initial version of the class via the class loader for the class.

12. The computer-implemented method as recited in claim 11, wherein said transforming bytecode of the class comprises:
   adding the static body class field to the class and initialize the static body class field to refer to an instance of the initial version of the static body class;
   adding the body class field to the class;
   altering the bytecode for each static method by inserting bytecode to check that the body class and the static body class are up-to-date with respect to the class file for the class and by inserting bytecode to delegate to the same-named instance method on the current static body class cast to the interface which the dynamic class reloading component generated for that method;
   altering the bytecode for each instance method by inserting bytecode to check that the body class and the static body class are up-to-date with respect to the class file for the class and by inserting bytecode to delegate to the same-named instance method on the current body class cast to the interface which the dynamic class reloading component generated for that method; and
   altering the bytecode at each place that a method on a different class managed by the dynamic class reloading component is invoked by inserting bytecode to check that a currently loaded instance of the different class is up-to-date with respect to the class file for the different class.

13. The computer-implemented method as recited in claim 8, further comprising determining that a currently loaded version of a class is not current with a class definition of the class in a class file in response to an invocation of a method of a currently loaded instance of the class.

14. The computer-implemented method as recited in claim 8, wherein said determining that a currently loaded version of a class is not current with a class definition of the class in a class file comprises determining that the currently loaded version of the class was loaded prior to a last modified time of the class file.

15. A non-transitory computer-readable storage medium storing program instructions, wherein the program instructions are computer-executable to implement:
   determining that a currently loaded version of a class in a running application is not current with a class definition of the class in a class file, wherein the class definition specifies a new version of the class; and
   in response to said determining:
      generating a new version of a body class for the class and a new version of a static body class for the class using bytecode from the class file, wherein the new versions of the body class and the static body class are given unique names, wherein the body class implements instance methods of the class according to the class definition of the class in the class file, and wherein the static body class implements static methods of the class according to the class definition of the class in the class file;
      generating an instance of the new version of the static body class and setting a static body class field of the class to refer to the instance of the new version of the static body class;
      for each existing instance of the class, generating an instance of the new version of the body class and setting a body class field of the existing instance of the class to the corresponding instance of the new version of the body class; and
      loading the new version of the class corresponding to the class definition of the class in the class file via a class loader for the class.

16. The non-transitory computer-readable storage medium as recited in claim 15, wherein, after said determining that a currently loaded version of a class is not current with a class definition of the class in a class file, the program instructions are computer-executable to implement recording date/time information for the class file corresponding to the class.

17. The non-transitory computer-readable storage medium as recited in claim 15, wherein, after said determining that a currently loaded version of a class is not current with a class definition of the class in a class file, the program instructions are computer-executable to implement generating an interface for each method of the class for which an interface has not previously been generated, wherein the body class implements the interfaces for instance methods of the class, and wherein the static body class implements the interfaces for static methods of the class.

18. The non-transitory computer-readable storage medium as recited in claim 15, wherein the program instructions are computer-executable to implement loading an initial version of the class according to an initial class definition of the class prior to said determining that a currently loaded version of the class is not current with the class definition of the class in the class file, wherein, in said loading an initial version of the class, the program instructions are computer-executable to implement:
   recording date/time information for the class file corresponding to the class;
   generating an interface for each method of the class according to the initial class definition of the class;
   generating an initial version of the body class and an initial version of the static body class according to the initial class definition of the class using bytecode from the class file, wherein the body class and the static body class are given unique initial names;
   transforming bytecode of the class; and
   loading the initial version of the class via the class loader for the class.

19. The non-transitory computer-readable storage medium as recited in claim 18, wherein, in said transforming bytecode of the class, the program instructions are computer-executable to implement:
   adding the static body class field to the class and initialize the static body class field to refer to an instance of the initial version of the static body class;

adding the body class field to the class;

altering the bytecode for each static method by inserting bytecode to check that the body class and the static body class are up-to-date with respect to the class file for the class and by inserting bytecode to delegate to the same-named instance method on the current static body class cast to the interface which the dynamic class reloading component generated for that method;

altering the bytecode for each instance method by inserting bytecode to check that the body class and the static body class are up-to-date with respect to the class file for the class and by inserting bytecode to delegate to the same-named instance method on the current body class cast to the interface which the dynamic class reloading component generated for that method; and altering the bytecode at each place that a method on a different class managed by the dynamic class reloading component is invoked by inserting bytecode to check that a currently loaded instance of the different class is up-to-date with respect to the class file for the different class.

20. The non-transitory computer-readable storage medium as recited in claim 15, wherein the program instructions are computer-executable to implement determining that a currently loaded version of a class is not current with a class definition of the class in a class file in response to an invocation of a method of a currently loaded instance of the class.

* * * * *